United States Patent
Komatsu et al.

[11] Patent Number: 5,805,626
[45] Date of Patent: Sep. 8, 1998

[54] SINGLE-CRYSTAL LITHIUM TETRABORATE AND METHOD MAKING THE SAME, OPTICAL CONVERTING METHOD AND CONVERTER DEVICE USING THE SINGLE-CRYSTAL LITHIUM TETRABORATE, AND OPTICAL APPARATUS USING THE OPTICAL CONVERTER DEVICE

[75] Inventors: Ryuichi Komatsu; Tamotsu Sugawara; Masakuni Takahashi, all of Saitama, Japan

[73] Assignee: Mitsubishi Materials Corporation, Tokyo, Japan

[21] Appl. No.: 710,714

[22] Filed: Sep. 20, 1996

[30] Foreign Application Priority Data

| Sep. 20, 1995 | [JP] | Japan | 7-242120 |
| Jan. 19, 1996 | [JP] | Japan | 8-007794 |
| Jan. 19, 1996 | [JP] | Japan | 8-007795 |
| Jan. 19, 1996 | [JP] | Japan | 8-007796 |
| Jan. 19, 1996 | [JP] | Japan | 8-007797 |
| Jan. 19, 1996 | [JP] | Japan | 8-007798 |
| Jan. 23, 1996 | [JP] | Japan | 8-009615 |
| Feb. 14, 1996 | [JP] | Japan | 8-026588 |
| Jun. 26, 1996 | [JP] | Japan | 8-165515 |

[51] Int. Cl.$^6$ .............. G02F 1/39; H01S 3/109
[52] U.S. Cl. .............. 372/41; 372/22; 359/328; 359/330
[58] Field of Search .............. 359/326–332; 372/21, 22, 39–42

[56] References Cited

U.S. PATENT DOCUMENTS

| 4,523,119 | 6/1985 | Whatmore et al. | 310/313 A |
| 4,634,913 | 1/1987 | Whatmore et al. | 310/313 A |
| 4,826,283 | 5/1989 | Chuangtian et al. | 385/122 |
| 5,251,059 | 10/1993 | Kouta | 359/326 |
| 5,274,650 | 12/1993 | Amano | 372/21 |
| 5,500,865 | 3/1996 | Chakmakjian et al. | 372/22 |

FOREIGN PATENT DOCUMENTS

| 0 104 559 | 4/1984 | European Pat. Off. |
| 0 644 636 | 3/1995 | European Pat. Off. |

OTHER PUBLICATIONS

Patent Abstracts of Japan, vol. 12, No. 501 (C–556), Dec. 27, 1988, and JP–210100, Aug. 31, 1988.
Journal of the Physical Society of Japan., vol. 59, No. 5, May 1990, pp. 1825–1830, Shin–ichi Furusawa, et al., "Raman Scattering Study of Lithium Diborate ($Li_2B_4O_7$) Single Crystal".

(List continued on next page.)

Primary Examiner—John D. Lee
Attorney, Agent, or Firm—Oblon, Spivak, McClelland, Maier & Neustadt, P. C.

[57] ABSTRACT

Single-crystal lithium tetraborate (single-crystal $Li_2B_4O_7$ or single-crystal LBO) as an optical converter device which stably operates for a long term, has a long life, and is compact, light and inexpensive, an optical converter device using the single crystal LBO, especially, for emitting light having a wavelength of 500 nm or less, and an optical apparatus using the optical converter device. Coherent light irradiates the light incident face of the single-crystal LBO at a predetermined incident angle, which single-crystal LBO is cut at a predetermined plane to the optical axis in order to satisfy a predetermined phase matching angle, and light having a half wavelength of the incident light is emitted. Preferably, the single-crystal LBO has a refractive index variation of $10^{-5}$/mm or less and/or a etch-pit density of approximately $1 \times 10^3/cm^2$. A first coherent light beam having a first wavelength and a second coherent light beam having a wavelength one-half or one-fourth of the wavelength of the first coherent light beam irradiates the incident face of the single-crystal LBO at a predetermined angle, and at least a coherent light having a wavelength one-third or one-fifth of the wavelength of the first coherent light beam is emitted by sum frequency generation, for example, when light having a wavelength of 209 nm is emitted, the wavelength of the first coherent light is 981 nm and that of the second coherent light is 266 nm.

55 Claims, 13 Drawing Sheets

SINGLE PATH TYPE

OTHER PUBLICATIONS

1992 Institute of Electrical and Electronics Engineers Frequency Control Symposium, pp. 724–731, 1992 [No Month], J. G. Gualtieri, et al., "Dilithium Tetraborate ($Li_2B_4O_7$) Fabrication Technology".

T.Y. Kwon et al., "Characteristics of critically phase–matched second–harmonic generation of a $Li_2B_4O_7$ crystal grown by the Czochralski method", *Materials Letters,* Jul. 1994, vol. 20, pp. 211–215.

S. Furusawa et al., "Second Harmonic Generation in $Li_2B_4O_7$", *Journal of the Physical Society of Japan,* Aug. 1991, vol. 60, No. 8, pp. 2691–2693.

RESONATOR TYPE

SINGLE-CRYSTAL LITHIUM TETRABORATE AND METHOD MAKING THE SAME, OPTICAL CONVERTING METHOD AND CONVERTER DEVICE USING THE SINGLE-CRYSTAL LITHIUM TETRABORATE, AND OPTICAL APPARATUS USING THE OPTICAL CONVERTER DEVICE

BACKGROUND OF THE INVENTION

1. Field of the Invention

The present invention relates to single-crystal lithium tetraborate (single-crystal $Li_2B_4O_7$ or single-crystal LBO) and to a method for making the single-crystal lithium tetraborate, a method for converting a wavelength of light and an optical device using the optical converter device. Further, the present invention relates to a method for making single-crystal LBO, and a method of an optical apparatus using single-crystal LBO as an optical converter device.

The optical apparatus using the single-crystal LBO of the present invention, as an optical converter device, may include wavelength converter devices which generate second harmonic, fourth harmonic, fifth harmonic light and the like. Other devices include various laser apparatuses and optical parametric oscillators which use the wavelength converter devices, and other apparatuses using the single-crystal LBO as non-linear optical converter devices.

2. Background of the Invention

Recording density can be improved by using a laser light beam having a shorter wavelength. Therefore, light sources which emit a laser light beam of a shorter wavelength are needed for reading data from and writing data on recording media. When a laser light beam of a shorter wavelength is used for material processing, finer processing can be performed. Further, light sources which emit a laser light beam of a shorter wavelength are needed for medical instruments and lithography of ultra LSIs. No practical light source emitting a light beam having a wavelength of 500 nm or less, however, has been developed. For example, semiconductor lasers can emit a laser light beam up to about 400 nm wavelength, but its output power is extremely low.

Excimer lasers have been known as short wave, high output lasers. The excimer laser was first found by Basov et al. in USSR in 1970 and was formed by means of electron beam excitation of liquid xenon (Xe). Excimer laser light was also formed by discharge excitation in 1976. In discharge excitation-type excimer lasers, a laser light beam is obtained by amplifying an ultraviolet light beam which is emitted from ArF (193 nm), KrF (248 nm), XeCl (308 nm) or the like by an optical resonator, with a pulse repeating oscillation laser. Applications of excimer lasers have been expected in abrasion processing, surface modification, and marking of polymer materials, thin film preparation, production of medical supplies and isotope separation. However, the use of excimer lasers is still unsatisfactory in processing or in film forming processes, because the light emission time is significantly short in relation to the interval, for example, a pulse light emission of $10^{-9}$ sec per $10^{-3}$ sec, in a pulse laser of a few hundred ppm (pulse per second). Further, in excimer lasers, the gas media employed have shorter lives and are toxic. Laser apparatuses can barely be miniaturized and maintained but only with higher operation costs. Accordingly, no semiconductor laser which stably emits ultraviolet light over a long period of time has been developed.

Non-linear optical devices such as secondary harmonic-wave generation (SHG) devices have been intensively investigated. Since SHG devices emit a light beam having a wavelength of one second of the incident light beam, an ultraviolet light beam can be emitted from an infrared laser light beam, for example. Thus, SHG devices have significant industrial advantages. Compact, light apparatuses, which can stably emit a visible or ultraviolet light beam over a long period of time, are needed in industrial fields such as optical information processing for recording and reading high density information, displays, optical measurements, material processing, medical care, and LSI productions.

An example of crystalline material used for wavelength converter devices such as SHG devices is KTP ($KTiOPO_4$) which is disclosed in Japanese Unexamined Patent No. 3-65597. Although a wavelength converter device using KTP has a wide transparent region of 0.25 to 4.5 $\mu$m to the wavelength of an incident laser, phase matching is not carried out at a region of less than 1 $\mu$m. Thus, when a YAG laser is used as an incidental laser light source, the wavelength converter device using KTP can emit only the light beam having the two-fold frequency (or the half wavelength) of the incident light. On the other hand, a need now exists for light having a shorter wavelength, for example, the fourth harmonic and fifth harmonic of a YAG laser. In addition, a large KTP crystal is hard to prepare, and the refractive index varies inside the crystal. Therefore, different KTP devices made of different crystals of KTP have different refractive indices, and thus have different phase matching angles, which result in difficulties in producing high precision wavelength converter devices. Moreover, KTP crystals often contain some voids which cause difficulties in the mass production of KTP devices of high quality.

Another example of crystalline material which is used wavelength as a converter device such as a SHG device is BBO ($\beta$-$BaB_2O_4$) which is disclosed in Japanese Unexamined Patent No. 63-279231. Although BBO has a greater durability to laser light than KTP, it is difficult to handle crystals of BBO and to form large crystals of the oxide material because of its strong deliquescence. A need therefore continues to exist for a crystalline material for wavelength converters of improved durability to laser light and of improved uniformity in structure.

SUMMARY OF THE INVENTION

Accordingly, one object of the present invention is to provide an optical converter device which can stably operate for a long period, can be readily processed, and is compact, light and inexpensive.

Another object of the present invention is to provide an optical converter device or optical converter apparatus which can effectively emit ultraviolet light.

Still another further object of the present invention is to provide various optical apparatuses using the optical converter device or optical converter apparatus described above, for example, an optical apparatus which can convert the frequency (or wavelength) of the output light from a YAG laser to ultraviolet light including four-fold and five-fold frequencies (or one-fourth and one-fifth wavelengths) of output light.

Yet another object of the present invention is to provide various optical apparatuses, e.g. laser apparatuses, which use the optical converter device and or optical converter device described above.

In a first embodiment of the invention, the wavelength of light is converted by irradiating a light incident face of single-crystal lithium tetraborate ($Li_2B_4O_7$) at a predetermined angle, which angle is cut at a predetermined plane to the optical axis so as to satisfy a predetermined phase matching angle with a coherent light beam of a wavelength of less than 1,000 nm, said converter thereby emitting a light beam having a half wavelength of the incident light beam.

In the method embodiment, first and second coherent light beams, each having a different wavelength irradiate the light incident face of the above-described single-crystal lithium tetraborate ($Li_2B_4O_7$) and a light beam having a wavelength which is the sum of the frequencies generated of the wavelengths of these two coherent light beams is emitted. Specifically, when the wavelength of the first coherent light beam is w and the wavelength of the second coherent light beam is $1/[(1/x)-(1/w)]$, a light beam having a wavelength of x is emitted from the $Li_2B_4O_7$ single-crystal. More specifically, when the first coherent light beam and the second coherent light beam, which has a wavelength of one-second or one-fourth of the wavelength of the first coherent light beam, irradiate the incident face of the $Li_2B_4O_7$ single-crystal at a predetermined angle, then at least a coherent light beam having a wavelength of one-third or one-fifth of the wavelength of that of the first coherent light beam is emitted.

In a second embodiment of the invention, the wavelength of light is converted by irradiating a light incident face of single-crystal lithium tetraborate ($Li_2B_4O_7$) at a predetermined angle, which angle is cut at a predetermined plane to the optical axis in order to satisfy a predetermined phase matching angle, with first and second coherent light beams each having a different wavelength, said converter thereby emitting a light beam having a wavelength which is the sum of the frequencies generated of the wavelengths of two coherent light beams. Preferably, when the wavelength of the first coherent light beam is w and the wavelength of the second coherent light beam is $1/[(1/x)-(1/w)]$, a light beam having a wavelength of x is emitted from the $Li_2B_4O_7$ single-crystal. Specifically, when the first coherent light beam and the second coherent light beam, which has a wavelength of one-second or one-fourth of the wavelength of the first coherent light beam, irradiate the incident face of the $Li_2B_4O_7$ single-crystal at a predetermined angle, then at least a coherent light beam having a wavelength of one-third or one-fifth of the wavelength of that of the first coherent light beam is emitted.

In a third embodiment of the present invention, the wavelength of light is converted by irradiating a light incident face of single-crystal lithium tetraborate ($Li_2B_4O_7$) at a predetermined angle, which angle is cut at a predetermined plane to the optical axis in order to satisfy a predetermined phase matching angle and has a refractive index variation of $10^{-5}$/mm or less and an etch-pit density of $1\times10^3/cm^2$ or less, with a coherent light beam having a predetermined wavelength, said converter thereby emitting a coherent light beam having a half wavelength of the incident light beam. In this embodiment, first and second coherent light beams, each having a different wavelength, irradiate the light incident face of the single-crystal lithium tetraborate ($Li_2B_4O_7$) and a light beam having a wavelength which is the sum of frequencies generated of the wavelengths of these two coherent light beams is emitted. Specifically, the first coherent light beam having a wavelength of w and the second coherent light beam having a wavelength of $1/[(1/x)-(1/w)]$ irradiate the ($Li_2B_4O_7$) single-crystal, and a light beam having a wavelength of x is emitted by the sum of frequencies generated of these coherent light beams. More specifically, the first coherent light beam and the second coherent light beam, which has a wavelength of one-second or one-fourth of the first coherent light beam, irradiate the incident face of the ($Li_2B_4O_7$) single-crystal at a predetermined angle, with the result that at least a light beam having a one-third or one fifth wavelength of the first light beam is emitted.

In a fourth embodiment of the present invention, the optical wavelength converter comprises single-crystal lithium tetraborate ($Li_2B_4O_7$) which is cut at a predetermined plane to the optical axis and emits a light beam having a wavelength which is the sum of frequencies generated of first and second incident coherent light beams which irradiate the light incident face so as to satisfy a predetermined phase matching angle. Preferably, when the wavelength of the first coherent light beam is w and the wavelength of the second coherent light beam is $1/[(1/x)-(1/w)]$, a light beam having a wavelength of x is emitted from the ($Li_2B_4O_7$) single-crystal. Specifically, when the first coherent light beam having a predetermined wavelength and the second coherent light beam having a wavelength of one-second or one-fourth of the wavelength of the first coherent light beam irradiate the single-crystal ($Li_2B_4O_7$), a light beam having a wavelength of one-third or of the one-fifth wavelength of the first coherent light beam is emitted.

In a fifth embodiment of the invention, a laser apparatus comprises: the wavelength converter of the fourth embodiment; a first light source which emits the first coherent light beam described above having a first wavelength; a second light source which emits the second coherent light beam described above having a second wavelength; and an optical device which introduces the first and second coherent light beams to a wavelength converter; wherein the laser apparatus emits a light beam having a wavelength which is the sum of frequencies generated of the wavelengths of the first and second coherent light beams. Preferably, the second light source has two wavelength converters as described in the fourth embodiment; and the first coherent light beam emitted from the first light source irradiates at least one wavelength converter and a light beam having a half or one-fourth wavelength of the incident light is emitted from the wavelength converter.

In a sixth embodiment of the invention, an optical-resonance-type laser apparatus comprises a first wavelength converter as described in the fourth embodiment, a second wavelength converter as described in the fourth embodiment provided at a position parallel to the first wavelength converter, a first half mirror, provided at the incident side of the first wavelength converter, by which the first wavelength converter is irradiated with the first coherent light beam, a second half mirror which receives a light beam emitted from the second wavelength converter, which light beam is deflected by a predetermined angle; a third mirror which deflects the light beam which is emitted from the second half mirror to the incident face of the second wavelength converter; and a fourth mirror which deflects the light beam emitted from the secondhalf mirror innverter onto the first half mirror in order to irradiate the first wavelength converter with the light beam; wherein the first coherent light beam having a predetermined wavelength irradiates the first half mirror and a coherent light beam having a one-fifth wavelength of the first coherent light beam is emitted from the second half mirror.

In a seventh embodiment of the present invention, an optical parametric oscillator comprises a light source which emits a coherent light beam having a pumping frequency of $\omega_p$; and an optical parametric oscillating section having the wavelength converter described in the fourth embodiment and first and second plano-concave half mirrors which receive the coherent light beam from the light source to achieve optical parametric oscillation in front of and behind the wavelength converter.

In an eighth embodiment of the invention, a laser apparatus for lithography comprises a light incident means which receives a first coherent light beam having a first wavelength and a second coherent light beam having a wavelength of one-second or one-fourth of the wavelength of the first coherent light beam, a wavelength converter as described in the fourth embodiment, a first plano-concave half mirror provided at the light incident side of the wavelength converter, a second plano-concave half mirror provided at the light emitting side of the wavelength converter, and an optical filter provided behind the second half mirror.

Preferably, the first coherent light beam which irradiates the light incident means is a laser beam from a light source selected from the group of Nd:YAG laser, Nd:YVO$_4$ laser, Cr:LiSAF laser, ruby laser, glass laser, alexandrite laser, garnet laser, sapphire laser, and semiconductor laser. More preferably, the laser apparatus for lithography further comprises an integrator for smoothing the intensity of the light beam, provided behind the optical filter.

In a ninth embodiment of the invention, a short wavelength solid-state laser apparatus for processing comprises a first light source which emits a first coherent light beam having a first wavelength; a second light source which emits a second coherent light beam having a wavelength of one-second or one-fourth of the wavelength of first coherent light beam from the first light source; and the wavelength converter described in the fourth embodiment which receives the first coherent light beam from the first light source and the second coherent light beam from the second light source; wherein the first light source emits the first coherent light beam at a predetermined energy for processing for a predetermined time; and the wavelength converter emits a light beam having a wavelength of one-fifth of the wavelength of the first coherent light-beam.

In a tenth embodiment of the present invention, single-crystal lithium tetraborate (single crystal ($Li_2B_4O_7$) is cut at a predetermined plane to the optical axis, and has a refractive index variation of $10^{-5}$/mm or less and/or an etch-pit density of $1 \times 10^3/cm^2$ or less.

In an eleventh embodiment of the invention, an optical wavelength converter comprises the single-crystal ($Li_2B_4O_7$) described in the tenth embodiment, wherein a coherent light beam having a predetermined wavelength irradiates the light incident face of the ($Li_2B_4O_7$) single-crystal at a predetermined incident angle in order to satisfy a predetermined phase matching angle for the emission of a light beam having a half wavelength of the incident light.

In an twelfth embodiment of the invention, an optical wavelength converter comprises the single-crystal ($Li_2B_4O_7$) described in the tenth embodiment, wherein, when the first and second coherent light beams which have different wavelengths from each other irradiate the light incident face of the above-mentioned single-crystal ($Li_2B_4O_7$), a light beam having a wavelength, which is the sum of frequencies generated of the two coherent light beams, is emitted from the light emitting face. Specifically, when the first coherent light beam having a wavelength of w and the second coherent light beam having a wavelength of $1/[(1/x)-(1/w)]$ irradiate the above-mentioned single-crystal ($Li_2B_4O_7$), an emitted light having a wavelength of x by sum frequency generation of two coherent light beams is obtained. More specifically, when the first coherent light beam having a wavelength of a first wavelength and the second coherent light beam having a wavelength of one-second or one-fourth of the wavelength of the first coherent light beam irradiate the incident face of the above-mentioned single ($Li_2B_4O_7$) at a predetermined angle, a light beam having a wavelength of one-third and one-fifth of the wavelength of the first coherent light beam is emitted.

In a thirteenth embodiment of the invention, a laser apparatus comprises a wavelength converter as described in the twelfth embodiment, a first light source which emits a first coherent light beam having a first wavelength; a second light source which emits a second coherent light beam having a second wavelength, and an optical device which introduces the first and second coherent light beams to the wavelength converter; wherein a light beam is produced which has a wavelength which is the sum of frequencies generated of the first and second coherent light beam.

In a fourteenth embodiment of the invention, an optical-resonance-type laser apparatus comprises a first wavelength converter as described in the twelfth embodiment; a second wavelength converter as described in the twelfth embodiment, which is provided at a position parallel to the first wavelength converter; a first half mirror provided at the incident side of the first wavelength converter which enables the irradiation of the first wavelength converter with the first coherent light; a second half mirror which receives the light emitted from the first wavelength converter and which deflects the light by a predetermined angle; a third mirror which deflects the light from the second half mirror toward the incident face of the second wavelength converter; and a fourth mirror which deflects the light emitted from the second wavelength converter toward the first half mirror in order to irradiate the first wavelength converter; wherein the first coherent light beam having a predetermined wavelength irradiates the first half mirror which results in the emission of a coherent light beam having a wavelength of one-fifth wavelength of the wavelength of the first coherent light from the second half mirror.

In a fifteenth embodiment of the invention, an optical parametric oscillator comprises a light source which emits a coherent light beam having a pumping frequency of $\omega_p$; and an optical parametric oscillating section having a wavelength converter as described in the twelfth embodiment; and first and second plano-concave half mirrors, provided in front of and behind the wavelength converter, which receive the coherent light beam from the light source to achieve optical parametric oscillation.

In a sixteenth embodiment of the invention, a laser apparatus for lithography comprises a light incident means which receives a first coherent light beam having a first wavelength and a second coherent light beam having a wavelength of one-second or one-fourth of the wavelength of the first coherent light beam; a-wavelength converter as described in the twelfth embodiment; a first plano-concave half mirror provided at the light incident side of the wavelength converter; a second plano-concave half mirror provided at the light emitting side of the wavelength converter; and an optical filter provided behind the second half mirror.

In a seventeenth embodiment of the invention, a short wavelength solid-state laser apparatus for processing comprises a first light source which emits a first coherent light beam having a first wavelength; a second light source which emits a second coherent light beam having a wavelength of one-second or one-fourth of the wavelength of the first coherent light beam from the first light source; a wavelength converter as described in the twelfth embodiment which receives the first coherent light beam from the first light source and the second coherent light beam from the second light source; wherein the first light source emits the first coherent light beam at a predetermined energy required for processing for a predetermined time; the wavelength converter emits a light beam having a wavelength of one-fifth of the wavelength of the first coherent light beam.

In an eighteenth embodiment of the invention, a short wavelength solid-state laser apparatus for processing comprises two optical wavelength converters which convert a first coherent light beam having a first wavelength into an emitted coherent light beam having one-fourth the wavelength of the first wavelength; a coherent light beam having half the wavelength of the first coherent-light beam being emitted from a first optical wavelength converter comprising a nonlinear crystal of a material such as KTP, BBO, KDP, $Li_2B_4O_7$, or $LiB_3O_5$; the light source of the first coherent light beam being energized at a predetermined energy for a predetermined time, using a second optical wavelength converter comprising a single-crystal lithium tetraborate; and a coherent light beam having one-fourth the wavelength of the first wavelength being emitted.

In a nineteenth embodiment of the invention, a laser apparatus comprises an optical wavelength converter comprising a $Li_2B_4O_7$ single-crystal which is cut at a predetermined plane to the optical axis in order to satisfy a predetermined phase matching angle, wherein two kinds of coherent light beams having different wavelength irradiate which the light incident face of the $Li_2B_4O_7$ single-crystal for the emission of a light beam having a wavelength which is the sum of frequencies generated of the wavelengths of the two incident light beams; a first light source which emits the first coherent light beam having the first wavelength; a second light source which emits the second coherent light beam having the second wavelength; and an optical device which introduces the first and second light beams to the wavelength converter; wherein the laser apparatus emits a light beam having a wavelength which is the sum of frequencies generated of the wavelengths of the first and second coherent light beams.

In a twentieth embodiment of the invention, an optical-resonance-type laser apparatus comprises a first optical wavelength converter which irradiates the light incident face of single-crystal lithium tetraborate ($Li_2B_4O_7$), which is cut at a predetermined plane to the optical axis in order to satisfy a predetermined phase matching angle, with two kinds of coherent light beams having different wavelengths, and which emits a light beam having a wavelength which is the sum of frequencies generated of two coherent light beams; a second optical wavelength converter provided at a position parallel to the first wavelength converter which irradiates the light incident face of a single-crystal lithium tetraborate ($Li_2B_4O_7$), which is cut at a predetermined plane to the optical axis in order to satisfy a predetermined phase matching angle, with two kinds of coherent light beams having different wavelengths, and which emit a light beam having a wavelength which is the sum of frequencies generated of two coherent light beams; a first half mirror provided at the incident side of the first wavelength converter in order to irradiate the first wavelength converter with the first coherent light beam; a second half mirror which receives the light emitted from the first wavelength converter in order to deflect the light at a predetermined angle; a third mirror which deflects the light emitted from the second wavelength converter toward the incident face of the second wavelength converter; and a fourth mirror which deflects the light emitted from the second wavelength converter towards the first half mirror which in turn deflects the light to the first wavelength converter; wherein the first coherent light beam having a predetermined wavelength irradiates the first half mirror, and a light beam having a one-fifth wavelength of-the first coherent light beam is emitted from the second half mirror.

In a twenty-first embodiment of the invention, an optical parametric oscillator comprises a light source which emits a coherent light beam having a pumping frequency of $\omega_p$; and an optical wavelength converter, which receives the coherent light from the light source, which irradiates two kinds of coherent light beams having different wavelengths on the light incident face of a single-crystal lithium tetraborate ($Li_2B_4O_7$), which is cut at a predetermined plane to the optical axis so as to receive the coherent light beam from the light source and satisfy a predetermined phase matching angle, which single crystal emits a light beam having a wavelength which is the sum of frequencies generated of two coherent light beams; and an optical parametric oscillating section comprising first and second plano-concave half mirrors provided in front of and behind the wavelength converter in order to perform optical a parametric oscillation.

In a twenty-second embodiment of the invention, a laser apparatus for lithography comprises a light incident means which receives a first coherent light beam having a first wavelength and a second coherent light beam having a wavelength of one-second or one-fourth of the wavelength of the first coherent light beam; an optical wavelength converter which irradiates two kinds of coherent light beams having different wavelengths onto the light incident face of single-crystal lithium tetraborate ($Li_2B_4O_7$) which is cut at a predetermined plane to the optical axis in order to satisfy a predetermined phase matching angle; a first plano-concave half mirror provided at the light incident side of the wavelength converter; a second plano-concave half mirror provided at the light emitting side of the wavelength converter; and an optical filter provided behind the second mirror.

In a twenty-third embodiment the invention, a short wavelength solid-state laser apparatus for processing comprises a first light source which emits a first coherent light beam having a first wavelength; a second light source which emits a second coherent light beam having a wavelength of one-second or one-fourth of the wavelength of the first coherent light beam from the first light source; and an optical wavelength converter which receives two kinds of coherent light beams having different wavelengths from the first and second light sources to the light incident face of a single-crystal lithium tetraborate ($Li_2B_4O_7$), which is cut at a predetermined plane to the optical axis in order to satisfy a predetermined phase matching angle, and which emits a light beam having a wavelength which is the sum of frequencies generated of the two coherent light beams; wherein the first light source emits the first coherent light beam in a predetermined energy for processing for a predetermined time; and the wavelength converter emits a light beam having one-third or one-fifth of the wavelength of the first coherent light beam.

In a twenty-fourth embodiment of the invention, a short wavelength solid-state laser apparatus for processing comprises two optical wavelength converters which convert a first coherent light beam having-a first wavelength into an emitted coherent light beam having one-fourth the wavelength of the first wavelength; a coherent light beam having half the wavelength of the first coherent light beam is emitted from a first optical wavelength converter comprising a nonlinear crystal material such as KTP, BBO, KDP, $Li_2B_4O_7$, or $LiB_3O_5$; the light source of the first coherent light beam being energized at a predetermined energy for a predetermined time, using a second optical wavelength converter comprising single-crystal lithium tetraborate which is cut at a predetermined plane to the optical axis in order to satisfy a predetermined phase matching angle; and a coherent light beam having one-fourth the first wavelength is emitted.

In a twenty-fifth embodiment of the invention, an optical converting and light emitting apparatus comprises single-crystal lithium tetraborate ($Li_2B_4O_7$) containing an element for activating laser oscillation. Preferably, the element for activating laser oscillation is a rare earth element, and the content ranges from 0.1 to 10 weight percent. Preferably, the optical converting and light emitting apparatus irradiates a laser light beam on the light incident face of the wavelength converter in order to satisfy a predetermined phase matching angle, and emits a predetermined laser light after wavelength conversion of the incident laser light beam.

In a twenty-sixth embodiment of the invention, a laser apparatus comprises a resonator comprising mirrors provided at both ends of the optical converter and light emitting apparatus as described in the twenty-fourth embodiment; and a light source which emits a coherent light beam to the resonator; wherein the resonator resonates the coherent light beam and emits a wavelength-converted light beam.

In a twenty-seventh embodiment of the invention, a laser light excitation-type laser apparatus comprises a resonator comprising mirrors provided at both ends of the optical converter and the light emitting apparatus described in the twenty-fourth embodiment containing a rare earth element in a predetermined amount as an activator; and a light source which emits a light beam by sum frequency generation of an exciting light having a first wavelength of $\lambda_1$, a second light beam having a second wavelength of $\lambda_2$ generated by excitation and a third light beam having a third wavelength of $\lambda_3$ which is the second harmonic of the second light beam to the resonator; wherein the resonator emits a light beam having a wavelength which is the sum or difference of a plurality of light beams.

In a twenty-eight embodiment of the invention, an optical converter device comprises a twining crystal structure for performing quasi-phase matching, which is formed by piling up alternately right- and left-handed $Li_2B_4O_7$ crystals.

In a twenty-ninth embodiment of the invention, a laser apparatus comprises a first light source which emits a first coherent light beam; a second light source which emits a second coherent light beam having one-second or one-fourth of the wavelength of the first coherent light; and an optical converter device which receives the first and second coherent light beams from the first and second light sources and which emits at least a coherent light beam having one-third or one-fifth the wavelength of the first coherent light beam.

A thirtieth embodiment of the invention is a method for making a single-crystal lithium tetraborate by pulling from a lithium tetraborate $Li_2B_4O_7$ melt at a predetermined orientation by the Czochralski method, wherein the single-crystal lithium tetraborate is pulled up at a temperature gradient between the surface of the melt and a position just 10 mm above the melt ranging from 30° to 200° C./cm, the temperature gradient above the position ranging from 5° to 50° C./cm, and the pull-up speed ranging from 0.1 to 2 mm/hour; the single-crystal lithium tetraborate having a refractive index variation of $10^{-5}$/mm or less and/or an etch-pit density of approximately $1 \times 10^3/cm^2$ or less.

A thirty-first embodiment of the invention is a method for making a single-crystal lithium tetraborate by pulling from a lithium tetraborate $Li_2B_4O_7$ melt, containing a predetermined amount of a laser oscillation activator, in a predetermined orientation by the Czochralski method, wherein the single-crystal lithium tetraborate is pulled up at a temperature gradient between the surface of the melt and a position just 10 mm above the melt ranging from 30° to 200° C./cm, the temperature gradient above the position ranging from 5° to 500° C./cm, and the pull-up speed ranging from 0.1 to 2 mm/hour.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present inventors have investigated single-crystal lithium tetraborate (abbreviated as single-crystal ($Li_2B_4O_7$) or single-crystal LBO), and have found that single-crystal LBO has a wide transparent wavelength range to incident laser light, high resistivity to laser damage, easy production in high quality which provides large size crystals, excellent processability, low deliquescent properties, and easy handling characteristics, and that it is useful as an optical wavelength converter device.

Preferred embodiments of single-crystal LBO of the present invention and optical converter devices using the single-crystal LBO will now be illustrated in detail.

"Single-Crystal LBO of the present invention (or single-crystal LBO in accordance with Example(s))" refers to single-crystal LBO produced by the method set forth below, and "general single-crystal LBO" refers to conventional single-crystal LBO used for SAW device and the like. "Single-crystal LBO" refers to both cases.

Basic Items of single-crystal LBO

The basic items of single-crystal LBO as an optical converter device of the present invention are now explained.

Method of Production

Figure 1:
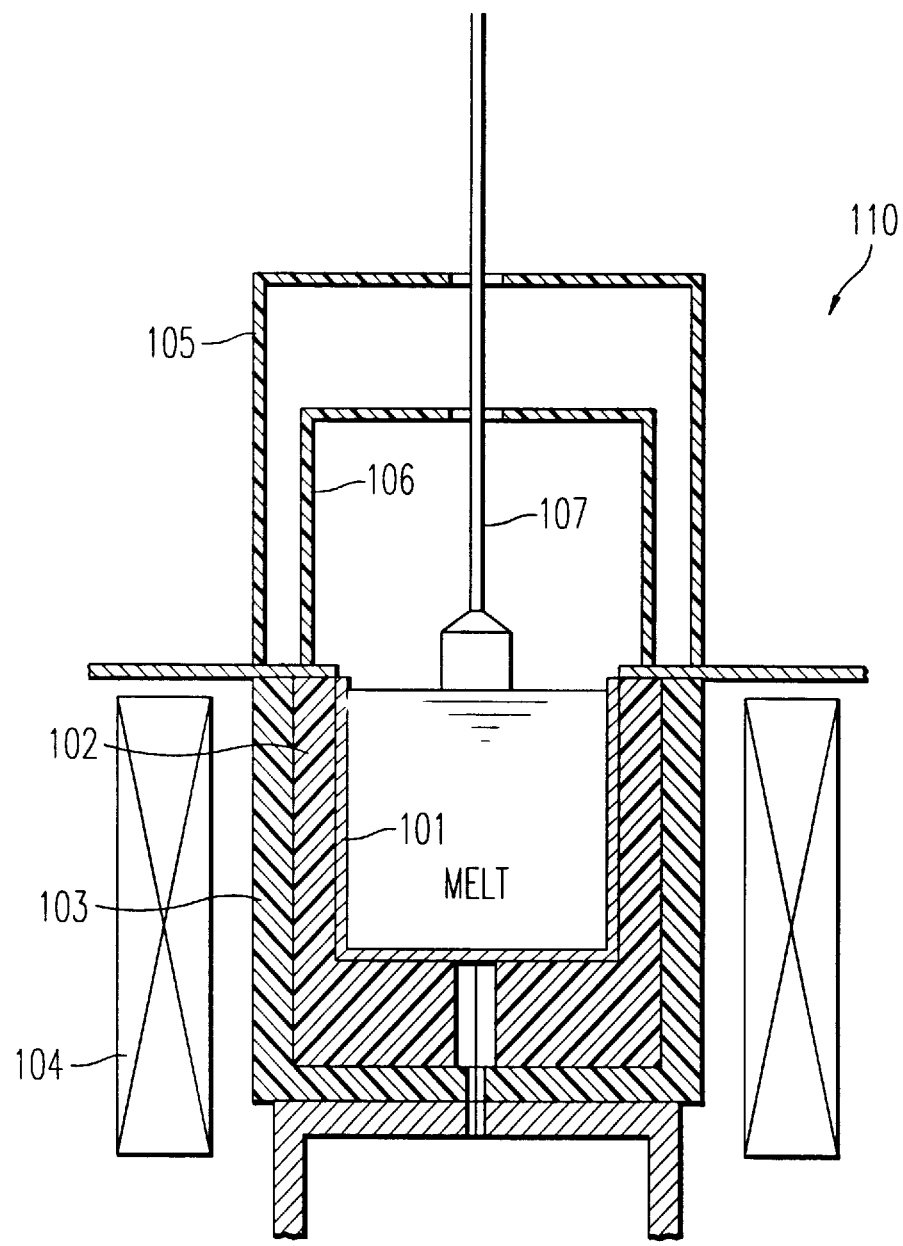
FIG. 1 is a cross-sectional view illustrating the pull-up equipment for making a single-crystal lithium tetraborate ($Li_2B_4O_7$: LBO) of the present invention.

The preferred method for producing (or growing) single-crystal LBO of the present invention is as follows:

Single-crystal LBO of the present invention is produced from polycrystalline LBO using pull-up equipment 110 of single-crystal LBO based on the Czochralski method as shown in FIG. 1. The pull-up equipment 110 includes a platinum crucible 101 containing molten LBO. Since ($Li_2B_4O_7$) has a lower melting point among oxides, the single-crystal can be grown up in the platinum crucible. The platinum crucible 101 is surrounded by a heater 104, e.g. a resistance heating furnace, which dissolves polycrystalline LBO through heat insulation materials 102, 103. Heat insulator walls 105, 106 are doubly provided above the platinum crucible 101, and a pull shaft 107 for mounting a seed crystal is provided so as to pass through the heat insulator walls 105, 106.

A single-crystal LBO rod is prepared from polycrystalline LBO using the pull-up equipment 110 so that the single-crystal LBO obtained exhibits the desired characteristics of an optical converter device. The single-crystal LBO rod is cut at a predetermined angle to the optical axis depending on use.

An embodiment of the growing conditions of single-crystal LBO is now explained.

A predetermined amount of polycrystalline LBO is placed in platinum crucible 101. It is melted by the heater 104, and then single-crystal LBO is pulled up in the (110) pull-up direction. The pull-up conditions are as follows: the temperature gradient between the melt surface and a position just 10 mm above the melt is 30° to 200° C./cm, preferably 50° to 150° C./cm. The temperature gradient above the position is 5° to 50° C./cm, preferably 10° to 40° C./cm. The pull-up speed of the single-crystal LBO body is 0.1 to 2 mm/hour, preferably 0.3 to 1 mm/hour.

The reason the temperature gradient between the melt surface and a position of just 10 mm above the melt is set to be 30° to 200° C./cm is that if the temperature gradient is less than 30° C./cm, polycrystalline LBO is readily produced. On the other hand, if the temperature gradient exceeds 200° C./cm, any transition readily forms in the pulled single-crystal LBO because of thermal strain.

The reason the temperature gradient at a point more than 10 mm above the melt is set to be 5° to 50° C./cm is that a smaller temperature gradient can reduce cracks because of the difference of the thermal expansion at the final growing stage.

The reason that the pull-up speed of the single-crystal LBO body is set to be 0.1 to 2 mm/hour is that if the pull-up speed is higher than the upper limit, white turbidity (nebula), or so called "nest" readily forms in the crystal, just as in the case of general LBO crystals used for surface acoustic wave devices.

The production of method and properties of the general LBO will be explained below.

A single-crystal block having a diameter of more than 1 inch can be prepared by the growing method of single-crystal LBO in the present invention. In a series of experiments, a single-crystal block having a diameter of 4 inches can be prepared.

Etch-pit Density

It has been found that general single-crystal LBO also exhibits excellent properties as an optical converter device in comparison to KTP or BBO, as shown in experimental results below. However, single-crystal LBO has some defects which include transition and impurity inclusion, which cause a decrease in the wavelength converting efficiency of the wavelength converter device because of the absorption and scattering of the laser light, i.e., the decrease in the quality of the emitted laser beam. When single-crystal LBO is used for a substrate material of SAW devices, such defects cause no problems.

The single-crystal LBO of the present invention produced by the above-mentioned conditions has a low etch-pit density. As a result of investigation, it has now been found that when the single-crystal LBO of the present invention having a low etch-pit density is used as an optical converter device, less absorption and scattering of laser light occurs compared to general LBO and thus it exhibits excellent optical characteristics. When the single-crystal LBO of the present invention having a low etch-pit density is used for a wavelength converter device, the absorption and scattering of laser light can decrease and thus the converting efficiency or the quality of the emitted light beam is enhanced.

When the single-crystal LBO of the present invention is grown up from polycrystalline LBO by the method and conditions described above, the etch-pit density can be suppressed to a low value, i.e., $1 \times 10^3/cm^2$ or less. Further, the refractive index variation is $10^{-5}$/mm or less.

The etch-pit density can be evaluated by the etched pit observation after etching or X-ray topography, for example.

The etch-pit density of the single-crystal LBO of the present invention is preferably $1 \times 10^2/cm^2$ or less when used for an optical wavelength converter.

The general single-crystal LBO which is used for a substrate material of a SAW device has an etch-pit density higher than $1 \times 10^3/cm^2$, and often has white turbidity or nests, although such single-crystal LBO exhibits excellent optical converter device characteristics compared to BBO or KTP.

Optical Characteristics

Figure 2:
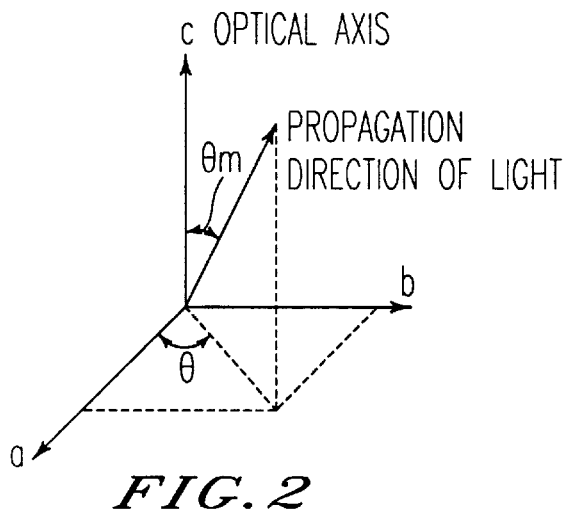
FIG. 2 is a schematic illustration of the definition of the phase matching angle in the single-crystal LBO.

It is found that wavelength conversion can be achieved when a laser light beam having a predetermined wavelength irradiates a single-crystal LBO at a specified angle to the optical axis (C axis) of the single-crystal, as shown in FIG. 2.

As the standard angle, the phase matching angle $\theta_m$ is used. When a fundamental wave is irradiated at an angle $\theta_m$ to the optical axis, its second harmonic wave is generated with phase matching in the same direction of the fundamental wave. This angle $\theta_m$ is called the phase matching angle. Single-crystal LBO is a negative uniaxial crystal having Type I phase matching properties. Therefore, only the phase matching angle $\theta_m$ among phase matching conditions should be taken into account.

Features

1. Since single-crystal LBO has a homogeneous composition, the upper and lower portions of the crystal have the same composition.

2. Single-crystal LBO exhibits low deliquescence and is stable to handle in comparison to other conventional crystals used for optical converter devices. When a deliquescent crystal is used, the optical converter device must be confined in a closed vessel, with temperature control, resulting in a complicated large apparatus. In contrast, single-crystal LBO is free from such problems.

3. Single-crystal LBO has excellent processability with regard to its polishing, cutting and the properties because of its crystal hardness similar to that of quartz.

4. Single-crystal LBO can be produced at lower production costs in comparison to other crystals used for wavelength converter devices.

5. Single-crystal LBO does not require a single polarization treatment. Further, incident light can be converted with high efficiency using a twining crystal because of the appearance of the quasi-phase matching (QPM) phenomenon. In this case, the wavelength converting method in which the C+ axis is rotated by 180 degrees is called wavelength converting by QPM. QPM has an advantage that the phase matching wavelength can be freely determined by the periodic length. Further, since single-crystal LBO can form a plurality of periods by means of a twinning crystal, the phase matching wavelength region can be expanded. Moreover, single-crystal LBO has a temperature range which allows phase matching two or more times wider than those in conventional crystals. Single-crystal LBO can be used in a bulk or light waveguide state. Additionally, single-crystal LBO can use the nonlinear optical constant d(33). Because the QPM is achieved by rotating the C+ axis by 180 degrees with a twinning crystal, it has been thought that it is applicable to only ferroelectric materials. The present inventors, however, have found that it is applicable to the single-crystal LBO of the present invention which is a paraelectric material.

The features set forth above are significantly important in the utilization of the single-crystal LBO as an optical converter device.

Use of Single-Crystal LBO

1. Wavelength converter device

The present inventors have found as a result of investigation on the optical characteristics of the single-crystal LBO of the present invention that it can perform wavelength conversion equivalent to or better than KTP or BBO.

For example, with a wavelength converter device using single-crystal LBO, the Nd:YAG laser (wavelength: 1064 nm) can generate highly coherent fourth harmonic (266 nm) and fifth harmonic (213 nm) light. If fourth or fifth harmonic light can be generated, laser light of ultraviolet wavelengths and its neighboring regions can be readily generated from an infrared laser by an existing high output apparatus. It enables applications in various fields, such as marking, lithography, semiconductor processing, and medical applications, as well as finer processing.

The present inventors have found that single-crystal LBO is practical for use in wavelength converter devices because the transparent wavelength region to the incident light is wider than the region of other crystals. Thus, the wavelength converter device of the present invention is applicable to a wide wavelength region.

Although a wavelength device using the single-crystal LBO has a small nonlinear optical constant, the conversion efficiency can be improved by large size crystals which can be readily prepared. (At the present stage, single-crystal LBO having a diameter of 4 inches can be prepared). The laser output is proportional to the square of the incident light intensity and the square of the crystal length.

A wavelength converter device using the single-crystal LBO has a significantly large threshold to laser damage compared to other crystals, resulting in its applicability as a wavelength converter device. A small threshold to laser damage causes crystal damage by a smaller laser energy and a decrease in durability. Since the wavelength converter device of the present invention has a large threshold, it enables higher laser output, as well as excellent durability.

2. Various laser apparatuses

In the wavelength converting method of the present invention, the wavelength of laser light is converted by passing the light thorough the single-crystal LBO. Further, it has been found that when two or more kinds of laser light beams irradiate the wavelength converter device using the single-crystal LBO at the same time, a laser light which is the sum of frequencies generated or difference frequency generation of wavelengths of input laser light beams can be obtained.

3. Optical parametric oscillator

A wavelength converter device using the single-crystal LBO of the present invention can also perform optical parametric oscillation.

Having generally described this invention, a further understanding can be obtained by reference to certain specific examples which are provided herein for purposes of illustration only and are not intended to be limiting unless otherwise specified.

EXAMPLE 1

A single-crystal $Li_2B_4O_7$ (single-crystal LBO) used for a second harmonic device (wavelength converter device) is now explained.

Single-crystal LBO Production (Growing) of the Present Invention

Using a pull-up apparatus as shown in FIG. 1, polycrystalline LBO having stoichiometric composition and a purity of 99.99 weight percent was placed into a 90-mm diameter, 100-mm high platinum crucible 101, and single-crystal LBO was grown by the Czochralski method.

As explained above, FIG. 2 is a graph illustrating the definition of the phase matching angle of single-crystal LBO.

Processing of the Single-Crystal LBO

The single-crystal LBO was cut so that the angle of the cut face 32 is 45 degrees to the optical axis (C axis), and the cut face 32 was optically polished to prepare a 15-mm by 15-mm by 10-mm optical converter device 30A of single-crystal LBO. When a coherent light beam i is irradiated onto the optical converter device 30A, the optical device emits light o having half the wavelength of the incident light, that is, the optical converter device 30A acts as an optical converter device (wavelength converter device) for second harmonic generation (SHG). For example, when a light having a wavelength of 532 nm (0.532 μm) is irradiated onto the wavelength converter device 30A for SHG, a light having a wavelength of 266 nm (0.266 μm) is emitted.

Refractive Index Variation

The refractive index variation of the single-crystal LBO in this example, as measured with a Mach-Zender interferometer, was $10^{-6}$/mm.

Experiment 1

Laser light having a wavelength range of 486 to 1265 nm from an optical parametric oscillator described below irradiated the wavelength converter device 30A, and a second harmonic coherent light having a wavelength range of 243 to 633 nm was emitted. No strain of the interference fringes was observed at the passing wavefront.

Phase Matching Angle

Figure 3:
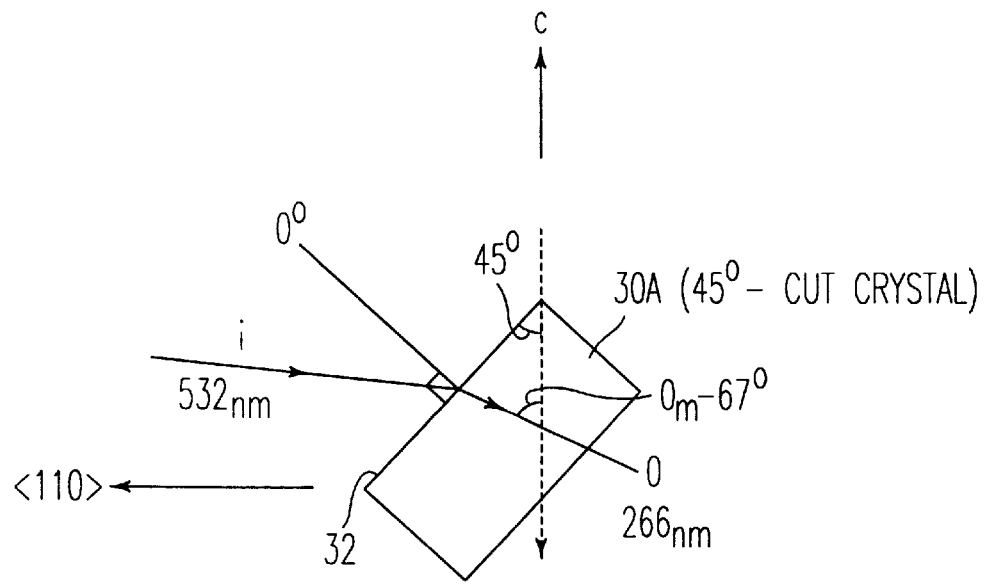
FIG. 3 is a schematic diagram illustrating the correlation between the cut face of the single-crystal LBO of an embodiment of the present invention and the phase matching angle.
Figure 4:
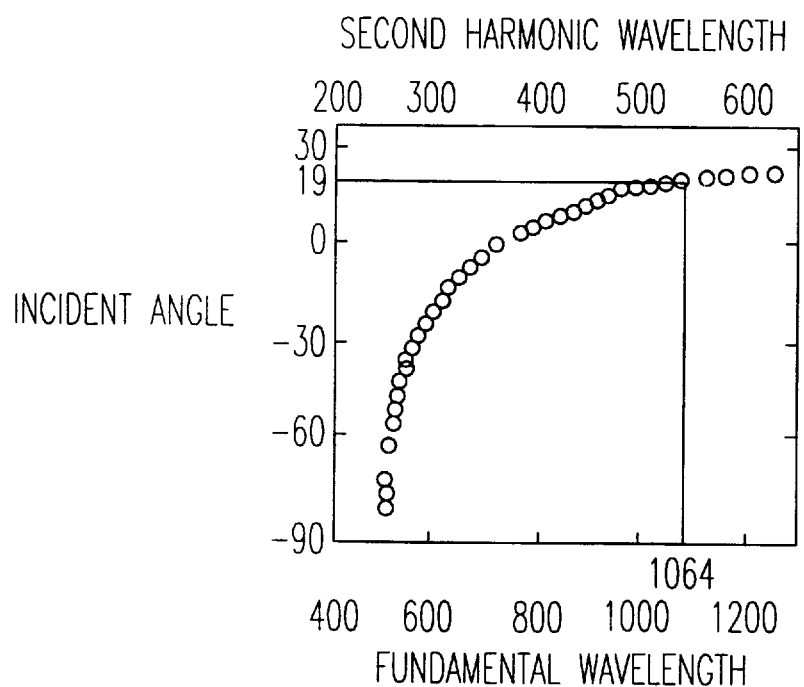
FIG. 4 is a graph illustrating the correlation between the incident angle of the laser and the fundamental wavelength in the phase matching using a single-crystal LBO in an embodiment of the present invention.

FIG. 4 demonstrates the phase-machined incident angle of the laser light vs. the wavelength of the laser light emitted from the optical parametric oscillator, wherein the incident angle of the laser light in the direction perpendicular to the 45°-cut face 32 in FIG. 3 is 0 degree. The single-crystal LBO is rotated plus(+) toward the C axis and minus (−) toward the (110) direction. The phase matching angle $\theta_m$ corresponding to each wavelength can be determined by the incident angle.

FIG. 4 demonstrates that when a coherent light having a predetermined wavelength irradiates the single-crystal LBO of this example in order to satisfy the phase matching condition, light having a wavelength half of that is emitted. In the following EXAMPLES AND COMPARATIVE EXAMPLES, a coherent light having a wavelength of 1064 from YAG laser is mostly used as a typical light beam. However, FIG. 4 demonstrates that the single-crystal LBO of the present invention can emit light having half the wavelength of the incident light within the incidental light range shown in the figure. The single-crystal LBO of the present invention can convert a coherent light having any wavelength into a light having half the wavelength of the coherent light. In apparatus using the single-crystal LBO, such as a wavelength converter and laser apparatus, set forth below, the use of the single-crystal LBO prepared by the preferred conditions will be exemplified. Various single-crystal LBOs of the present invention other than the single-crystal LBO set forth above can also be used.

When laser light is irradiated on the crystal from a predetermined angle, the laser light passes through the crystal while refracting as a function of the refractive index according to Snell's law. The phase matching angle $\theta_m$ is equal to the angle between the refracted laser light after the second harmonic is generated and the C axis, when the single-crystal LBO is used as a wavelength converter device for SHG.

The graph in FIG. 4 evidently demonstrates that the incident angle is approximately 19 degrees when laser light having a wavelength 1,064 nm is irradiated on the face 32 of the single-crystal LOB. In other words, when the fundamental wave (1,064 nm) of YAG laser is irradiated, phase matching is achieved at an incident angle of approximately plus 19 degrees. Since the refractive index of the single-crystal LBO is approximately 1.6, the refractive angle is approximately 12 degrees. Thus, the angle with the C axis, i.e., phase matching angle, is approximately 33 degrees. A phase matching angle at an appropriate wavelength can be determined in a similar manner.

The correlation between the wavelength and the phase matching angle is summarized in Table 1.

TABLE 1

Wavelength vs. Phase Matching Angle

| Incident Wavelength (nm) | Emitted Wavelength (nm) | Refractive Index | Phase Matching Angle |
|---|---|---|---|
| 1,064.0 | 532.0 | 1.6009 | 33.22 |
| 709.3 | 354.7 | 1.6054 | 44.41 |
| 643.8 | 321.9 | 1.6083 | 50.09 |
| 578.1 | 289.1 | 1.6107 | 58.18 |
| 532.0 | 266.0 | 1.6132 | 67.17 |
| 508.6 | 254.3 | 1.6170 | 74.43 |

Table 1 shows the refractive index of the single-crystal LBO and the phase matching angle when a light having a given wavelength is converted into a light having half its wavelength.

As the incident light, a coherent light from the optical parametric apparatus was used. Further, the light of 1,064.0 nm is that from a YAG laser, and the light of 532.0 nm is obtained by converting the light from the YAG laser to half its wavelength with KTP as a SHG.

Phase matching methods include phase matching by the angle method using birefringence which is applied in the present invention and phase matching by temperature control using the dependency of the refractive index on the temperature. In the present invention, the latter matching also is applicable.

Discussion of Table 1 and FIG. 4

The graph in FIG. 4 demonstrates that when light is irradiated onto the single-crystal LBO by this example at an incident angle shown in FIG. 4, light having half the wavelength of the incident light can be emitted, as well as the conversion of the incident light of 1.064 nm into half the wavelength of light of 532 nm as set forth above. Conversion of the light having a wavelength other than 1,064 nm has not been achieved.

Table 1 illustrates actual examples of the graph shown in FIG. 4. In Table 1, the phase matching angle is used instead of the incidental angle in FIG. 4. The Sellmeier's equation can be obtained by measuring the refractive indices at various wavelengths and adjusting the operation process. Alternately, the refractive indices at various wavelengths can be calculated by solving the Sellmeier's equation, and thus the phase matching angle can be determined.

Figure 5:
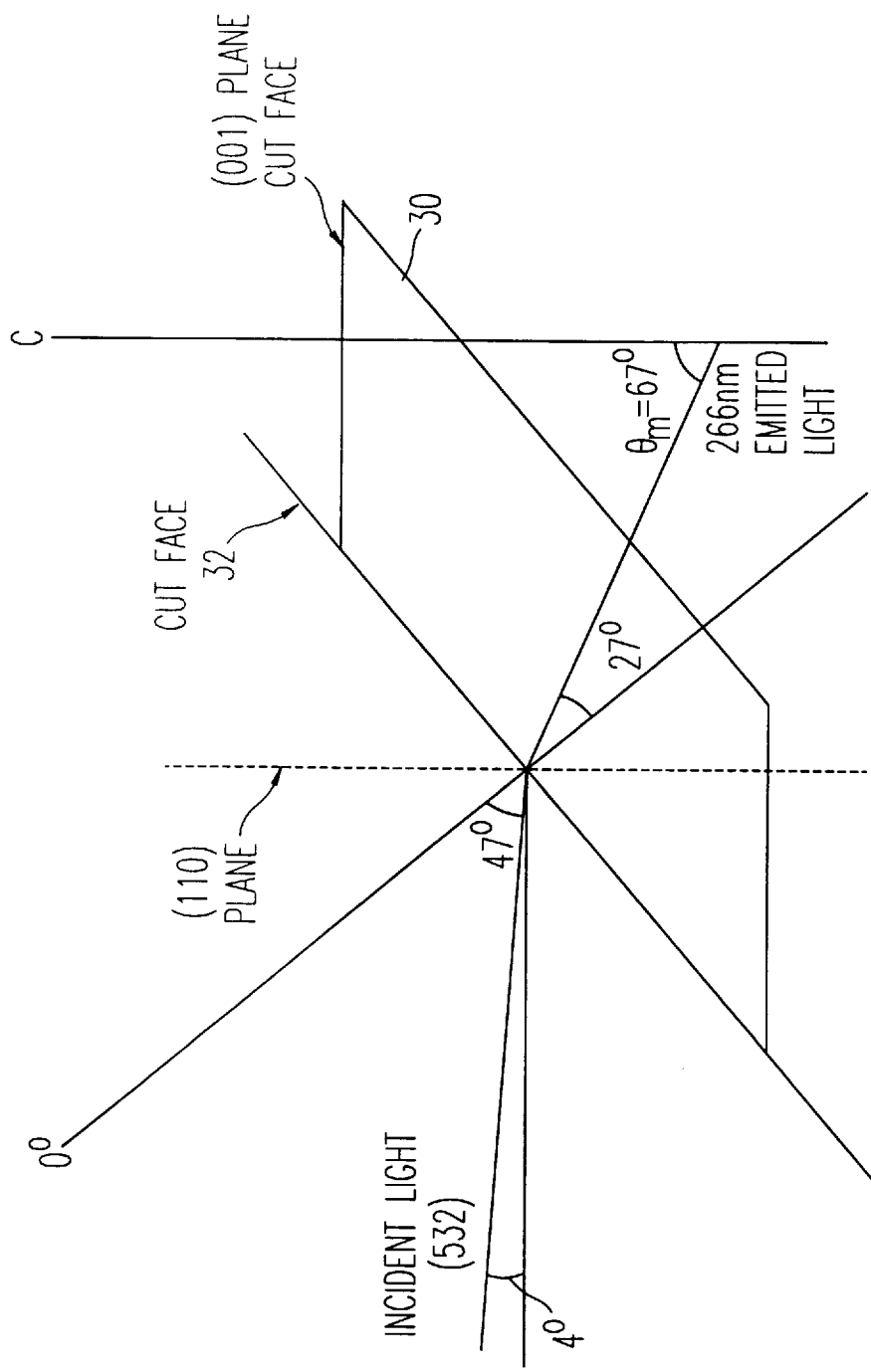
FIG. 5 is a schematic diagram illustrating the correlation between the phase matching angle and the light incident angle when a single-crystal LBO of an embodiment of the present invention is used as a wavelength converter device for the second harmonic.

FIG. 5 is a geometrical view illustrating the correlation of the phase matching angle $\theta_m$ and the incident angle when the single-crystal LBO set forth above is used as a wavelength converter device and an incident wave of 532 nm is converted into the half wave of 266 nm.

Wavelength converting Function

KTP or BBO other than single-crystal LBO also can act as SHG. The single-crystal LBO can emit the light of one-third or one-fifth the incident wavelength of 1,064 nm from a YAG laser by adding two coherent light beams having different wavelengths (hereinafter merely referred to as "sum frequency generation"), as set forth below. In contrast, KTP does not have such a wavelength converting function. Although BBO can emit the light of one-third or one-fifth of the incident wavelength of 1,064 nm from a YAG laser by adding or subtracting two coherent light beams having different wavelengths like single-crystal LBO, a large crystal size cannot be used because of a large walk-off angle, not resulting in improvement in converting efficiency.

When a single-crystal LBO having a low etch-pit density of the present invention is used, a light of one-third or one-fifth of the wavelength of the incident coherent light can be emitted with high efficiency. Typically, the single-crystal LBO can stably emit light of one-third or one-fifth of the wavelength of the incident light (1,064 nm) from the YAG laser.

Resistivity to Laser Damage

The resistivity of the wavelength converter device comprising the single-crystal LBO of this example to laser damage was determined by the following method and the results are summarized in Table 2. Table 2 demonstrates that the resistivity of the single-crystal LBO to laser damage is five times or more larger than that of BBO (compare the resistivity to laser damage of Example 1 (a few dozen $GW/cm^2$) with Comparative Example 2 (a few $GW/cm^2$)). The resistivity to laser damage was determined by the following steps: The output of the laser irradiated to the crystal was gradually increased. The output of the laser was measured when the damage of the crystal can be visualized. The laser beam radius was measured at a predetermined position of the crystal; and the output per unit area was calculated.

TABLE 2

|  | Example 1 | Comp. Ex. 1 | Comp. Ex. 2 | Comp. Ex. 3 |
|---|---|---|---|---|
| Material | $Li_2B_4O_7$ | KTP | BBO | KDP |
| Converted Wavelength | 5th harmonic available | Up to 2nd harmonic | 5th harmonic available | 5th harmonic available |
| Resistivity to Laser Damage ($GW/cm^2$) | A few to a few hundred | 450 $MW/cm^2$ | A few to a few dozen | 10 $MW/cm^2$ |
| Transparent Region (nm) | 170 to 3500 | 250 to 4500 | 190 to 2500 | 180 to 1700 |
| Deliquescence | Extremely Low | None | Slightly soluble to water | High |
| High Quality, Large Crystal | Available | Not Available | Not Available | Available |

Transparency

The transparent wavelength region of the wavelength converter device 30A using the single-crystal LBO of this example to incident laser light ranges from 170 to 3500 nm as shown in Table 2. Thus the wavelength converter device 30A has a wide transparent region.

Handling and Processability

The wavelength converter device 30A comprising the single-crystal LBO of this example exhibits only very slight deliquescence as well as excellent polishing characteristics, resulting in excellent handling characteristics, as shown in Table 2.

Size of Single-Crystal

It was confirmed that a large single-crystal LBO having a diameter of 4 inches or more can be formed.

Durability

The wavelength converter device 30A comprising the single-crystal LBO of this example is less affected by ultraviolet light and thus has a longer life compared to BBO.

REFERENCE 1

The single-crystal LBO of EXAMPLE I was compared to a conventional single-crystal LBO.

A conventional single-crystal LBO was grown up using the pull-up equipment 110 shown in FIG. 1, wherein the grow-up conditions were changed. In REFERENCE 1, the temperature gradient between the melt surface and the position just 10 mm above the melt was 250° C./cm, the temperature gradient above the position was 70° C./cm, and the pull-up speed of the single-crystal body was 2.5 mm/hour. That is, the temperature gradients and the pull-up speed were increased in REFERENCE 1, in comparison to those in EXAMPLE 1. Other conditions were the same as in EXAMPLE 1. The resulting single-crystal LBO was cut as shown in FIG. 3 like EXAMPLE 1, and the incident and emitting faces of the single-crystal LBO were optically polished. The resulting crystal has mostly the same size as that in EXAMPLE 1.

When light of 532 nm from the second harmonic of a YAG laser was irradiated on the conventional single-crystal LBO, a light having half the wavelength of the incident light was irradiated like the single-crystal LBO of the present invention. Thus, it is confirmed that the conventional LBO also has optical converting characteristics like the single-crystal LBO of the present invention.

However, in the conventional single-crystal LBO, white turbidity can be observed and thus the intensity of the emitted light is lower than that in the single-crystal LBO of the present invention.

The refractive index variation of the conventional single-crystal LBO measured by the Mach-Zender interferometer was $10^{-4}$/mm, and was higher than $10^{-6}$/mm in EXAMPLE 1.

As set forth above, in REFERENCE 1, when a coherent light of wavelength of 1,000 nm or less is irradiated at a predetermined angle onto the light incident face of the conventional single-crystal lithium tetraborate ($Li_2B_4O_7$), which is cut at a predetermined plane to the optical axis in order to satisfy a predetermined-phase matching angle, light having a wavelength of approximately one-second of that of the incident light can be emitted.

EXAMPLE 2

A single-crystal LBO is used as a wavelength converter device for the second harmonic in EXAMPLE 2.

Production Method of the Single-Crystal LBO Single-crystal LBO was prepared with the pull-up equipment 110 shown in FIG. 1. A 90-mm diameter, 100-mm high platinum crucible 101 was filled with 1300 g of polycrystalline LBO having a stoichiometric composition and a purity of 99.99 %. After the LBO was melted with a heater, a single-crystal LBO having a diameter of 2 inches was pulled up in the pull-up direction (110).

The pull-up conditions in EXAMPLE 2 are as follows: The temperature gradient between the melt surface and a position just 10 mm above the melt was 80° C./cm; The temperature gradient above the position was 30° C./cm; The pull-up speed of the single-crystal LBO body was 0.5 mm/hour.

The etch-pit density of the grown single-crystal LBO determined by an etching method was sufficiently small, i.e., $5 \times 10/cm^2$.

Processing

The resulting single-crystal LBO was cut in order to satisfy the phase matching angle $\theta_m$ of approximately 67° in order to evaluate the second harmonic characteristics, and the incident and emitting faces were-optically polished. The size of the crystal was 10 mm in diameter and 25 mm in length.

Laser light having an output power of 100 mJ and a wavelength of 532 nm was irradiated onto this single-crystal, and the transparent light was evaluated. Emitted light having a wavelength of 266 nm was observed, illustrating that the single-crystal LBO obtained in EXAMPLE 2 is a material which exhibits excellent wavelength converting characteristics. The converting efficiency calculated from the laser incident output power and the emitted output power was approximately 15%.

REFERENCE 2

A single-crystal LBO was prepared according to a conventional process of single-crystal LBO used for SAW devices. The conventional single-crystal LBO was grown using the pull-up equipment shown in FIG. 1, but the grow-up conditions were changed as follows: The temperature gradient between the melt surface and a position of just 10 mm above the melt was 250° C./cm; The temperature gradient above the position was 70° C./cm; The pull-up speed of the single-crystal body was 2.5 mm/hour. The temperature gradients and the pull-up speed in REFERENCE 2 were increased compared with EXAMPLE 2. Other conditions were the same as described in EXAMPLE 2.

The etch-pit density of the resulting single-crystal LBO determined by the etching method was $2 \times 10^4/cm^2$ and turbidity was observed in the single-crystal LBO. Thus, the quality of this conventional single-crystal LBO prepared by the conditions of REFERENCE 2 is low as an optical converter device.

This single-crystal LBO was cut according to EXAMPLE 2 and the incident and emitting faces were optically polished in order to evaluate second harmonic characteristics. The crystal has the same size as that in EXAMPLE 2. A laser light having an output power of 100 mJ and a wavelength of 532 nm was irradiated onto this single-crystal and the transparent light was observed for evaluation. Although light of 266 nm wavelength was observed, the converting efficiency was lower, i.e., approximately 9%, compared with that in EXAMPLE 2. In other words, when the single-crystal LBO of EXAMPLE 2 is used as an optical converter device, it exhibits a high converting efficiency.

EXAMPLE 3

A single-crystal LBO was used for a wavelength converter device for the fifth harmonic in EXAMPLE 3.

Single-Crystal LBO Production

Using the pull-up equipment 110 shown in FIG. 1, 1,300 g of polycrystalline LBO having a stoichiometric composition and a purity of 99.99 weight percent was placed into a 90-mm diameter, 100-mm high platinum crucible, and a single-crystal LBO was grown up by the Czochralski method. The pull-up conditions were the same as those described in EXAMPLES 1 or 2.

Processing of Single-Crystal LBO

Grown-up single-crystal LBO was cut at the (110) plane and the (001) plane, and the incident face or the (110) plane was optically polished to prepare a wavelength converter device 30B comprising 15-mm by 15-mm by 15-mm single-crystal LBO.

Experiment 2

Laser light (output power 1 J) of fundamental frequency ω (incident wavelength $\lambda_2$=1,064 nm) and auxiliary laser light (output power 250 mJ) of the fourth harmonic wave light 4 ώ of the fundamental frequency ($\lambda_1$=¼·$\lambda_2$=266 nm) irradiated the wavelength converter device 30B at the same time. Light (output power 150 mJ) of the fifth harmonic wave light 5 ώ of the incident frequency (wavelength= ⅕·$\lambda_2$=213 nm) was generated as the sum of the frequencies generated by the two waves.

The phase matching angle determined by the method according to Experiment 1 was approximately 79 degrees, the shortest wavelength by sum frequency generation was 209 nm, and the phase matching angle at the shortest wavelength was approximately 90 degrees.

The correlation between various incident angles and their respective phase matching angles is shown in Table 3.

TABLE 3

Wavelength vs. Phase Matching Angle

| Incident $\lambda_1$ (nm) | Wavelength $\lambda_2$ (nm) | Emitted Wavelength (nm) | Phase Matching Angle (Degree) |
|---|---|---|---|
| 266 | 1,064 | 213 | 79 |
| 266 | 981 | 209 | 90 |

Table 3 demonstrates that when obtaining emitted light by sum frequency generation, for example obtaining an emitted light of wavelength x=209 nm, the wavelength of the first coherent light is an appropriate w (nm), for example, 981 nm, and that of the second coherent light is $1/[(1/x)-(1/w)]$ (nm), for example 266 nm.

Further, when a first coherent light of the first wavelength and a second coherent light of one-second or one-fourth of the wavelength of the first coherent light irradiate the incident face of the single-crystal $Li_2B_4O_7$, at least coherent light having a wavelength of one-third or one-fifth of the first coherent light can be emitted.

The phase matching angle in Table 3 calculated at the refractive index of 1.6 may not be accurate, because the refractive index of the crystal varies with temperature and the wavelength of the incident light. However, the accurate phase matching angle is probably within ±10 degrees. When the refractive index is accurately determined, the accurate phase matching angle can be readily determined by the method shown in Experiment 1.

The phase matching was carried out by angle control utilizing birefringence. Phase matching by temperature control utilizing the dependency of the refractive index on temperature also is applicable.

The refractive indices of single-crystal LBO were measured at various wavelengths and the operation process was matched to determine the Sellmeier equation. Alternately, the refractive indices at various wavelengths can be calculated by solving the Sellmeier equation to determine the phase matching angle.

REFERENCE 3

The conventional single-crystal LBO explained in References 1 and 2 was used for one-fifth wavelength conversion. The phase matching angle was approximately 79 degrees, the shortest wavelength by sum frequency generation was 209 nm, and the output power at the shortest wavelength was 50 to 120 mJ. Turbidity was found in the conventional single-crystal LBO and the refractive index variation determined by a Mach-Zender interferometer was $10^{-4}$/mm.

In contrast, when one-fifth wavelength conversion was carried out using the single-crystal LBO in EXAMPLE 3 having no turbidity and a refractive index variation of $10^{-6}$/mm, the fifth harmonic wave was stably obtained.

Accordingly, although the fifth harmonic light beam can be obtained by using the conventional single-crystal LBO, it can be more stably obtained with a high converting efficiency by using the single-crystal LBO of EXAMPLE 3.

Comparative Example 1

KTP instead of the single-crystal LBO in accordance with the present invention was used as a wavelength converter device 30B. The converter wavelength characteristics, resistivity to laser damage, transparent region, deliquescence, availability of a high quality, and large crystal were investigated like Experiment 2. Results are shown in Table 2. Table 2 shows that the wavelength converter device 30B using the single-crystal LBO of the present invention is excellent in comparison to that in KTP.

Comparative Example 2

BBO instead of the single-crystal LBO of the present invention was used as a wavelength converter device 30B. The converting wavelength characteristics, resistivity to laser damage, transparent region, deliquescence, availability of high quality, and large crystal were investigated like Experiment 1. Results are shown in Table 2. Table 2 illustrates that the wavelength converter device 30B using the single-crystal LBO of the present invention is excellent compared to that in BBO. Since BBO was grown up by a flux method, it readily includes impurities and the yield is low, whereas the single-crystal LBO of the present invention has a high yield. Further, after irradiating BBO with ultraviolet light, the crystal center is colored because of crystal deterioration, whereas the wavelength converter device using the single-crystal LBO of the present invention does not undergo such deterioration.

Comparative Example 3

KDP instead of the single-crystal LBO of the present invention was used as wavelength converter device 30B. The conversion wavelength characteristics, resistivity to laser damage, transparent region, deliquescence, availability of high quality, and large crystal were investigated as described in Experiment 1. Results are shown in Table 2. Table 2 illustrates that the wavelength converter device 30B using the single-crystal LBO of the present invention is excellent compared to that in KDP.

As set forth above, when obtaining an emitted light by sum frequency generation, for example obtaining an emitted light of wavelength x=209 nm, the wavelength of the first coherent light is an appropriate w (nm), for example, 981 nm, and that of the second coherent light is $1/[(1/x)-(1/w)]$ (nm), for example 266 mn. Further, when a first coherent light having a first wavelength and a second coherent light having one-second or one-fourth the wavelength of the first coherent light irradiate the incident face the single-crystal $Li_2B_4O_7$ at a predetermined angle, at least coherent light having one-third or one-fifth the wavelength of the first coherent light can be emitted.

Single-crystal lithium tetraborate ($Li_2B_4O_7$) is cut at a predetermined plane to the optical axis, has a refractive index variation of $10^{-5}$/nm or less and/or an etch-pit density of $1 \times 10^3/cm^2$ or less, wherein coherent light having a predetermined wavelength is irradiated onto the light incident face at a predetermined angle so as to satisfy a predetermined phase matching angle, and light having one-second the wavelength of the incident light is emitted.

EXAMPLE 4

Figure 6:
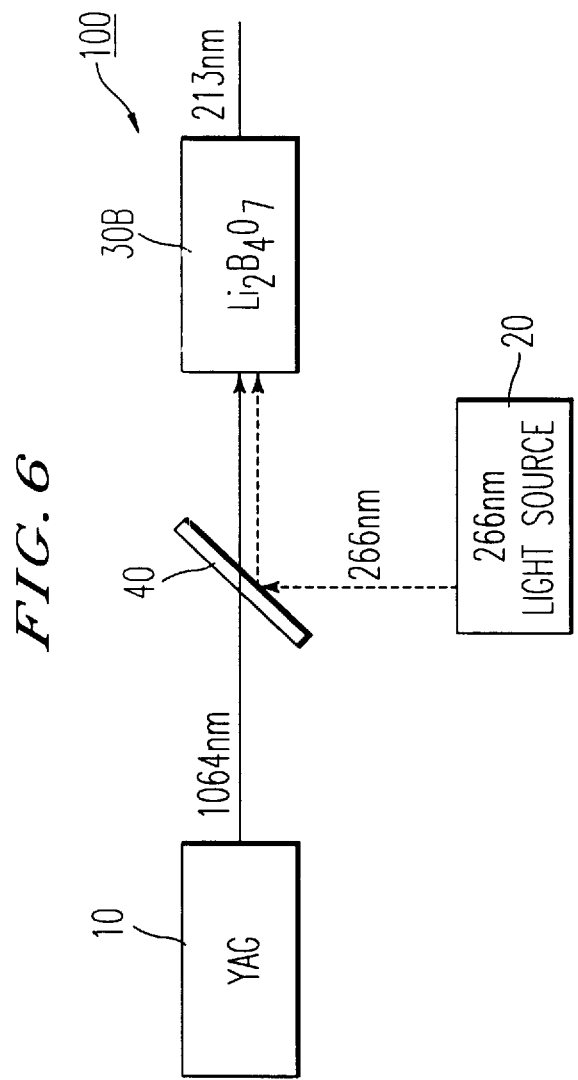
FIG. 6 is a schematic diagram illustrating a laser apparatus using a single-crystal LBO as a wavelength converter device for the fifth harmonic in Example 3 of the present invention.

Utilizing one-fourth or one-fifth wavelength converting function of single-crystal LBO, a laser apparatus which emits ultraviolet light from the incident infrared light by using the single-crystal LBO as a wavelength converter device was realized as shown in FIG. 6.

The laser apparatus 100 in FIG. 6 comprises a Nd:YAG laser 10 which emits coherent light having an infrared wavelength of 1,064 nm, a secondary light source 20 for emitting coherent light having a wavelength of 266 nm, a wavelength converter device 30B comprising single-crystal LBO of present invention, and a half mirror 40.

The secondary light source 20 receives laser light having a wavelength of 1,064 nm from a Nd:YAG laser, for example, and emits laser light having the one-fourth wavelength (266 nm) of the fundamental light by passing twice through a wavelength converter device, for example, a $\beta$-$BaB_2O_4$ (BBO) single-crystal wavelength converter device for converting the incident light into the one-second wavelength, and a wavelength converter device comprising single-crystal LBO for SHG of the present invention. Alternately, the secondary source 20 can convert the incident light having a wavelength of 1,064 nm into laser light having the one-fourth wavelength (266 nm) of the incident light by using a wavelength converter device comprising single-crystal LBO for SHG. At a first optical path, laser light having a wavelength of 1,064 nm emitted from the Nd:YAG laser 10 is irradiated onto the wavelength converter device 30B through the half mirror 40. At a second optical path, laser light having a wavelength of 266 nm from the secondary light source 20 is reflected by the half mirror 40 and irradiates the wavelength converter device 30B with the laser light from the Nd:YAG laser 10. Laser light beams which irradiate the wavelength converter device 30B from the first and second optical paths are converted into short wavelength laser light of one-fifth wavelength (213 nm) of the laser light (1,064 nm) from the Nd:YAG laser 10 by sum frequency generation in the wavelength converter device 30.

As set forth above, this laser apparatus can convert infrared light (1,064 nm) into ultraviolet light (213 nm) having one-fifth the wavelength of the infrared light by means of the combination of the Nd:YAG laser 10, the secondary light source 20, and the wavelength converter device 30B.

The Nd:YAG laser 10 comprises a transparent crystal YAG matrix and Nd as additive. The Nd:YAG laser 10 continuously emits a strong infrared light in the region of 1.05 to 1.12 $\mu$m and in particular 1.064 $\mu$m.

Further, single-crystal LBO has a high transparency to a wide range of wavelength and is less damaged by laser light. Moreover, high quality, large size crystals can be readily produced. Additionally, single-crystal LBO has excellent processability, is less deliquescent and thus can be readily handled. Single-crystal LBO has a long life.

The laser apparatus 100 of the present invention is compact and stably works for a long time. Further, this laser apparatus can emit high energy, short wavelength, ultraviolet light (213 nm, for example) at room temperature. This laser apparatus can substitute for an excimer laser. Thus, the laser apparatus 100 may be used in various fields, such as printing, reproduction photography, optical measurement, and lithography in ultra LSI.

EXAMPLE 5

Another laser apparatus using the single-crystal LBO of the present invention as a wavelength converter device for the fifth harmonic is now explained.

Single-Crystal Production

A single-crystal LBO was grown up with the pull-up equipment shown in FIG. 1 by the Czochralski method.

When the single crystal was pulled up in the C axis direction many bubbles were included, whereas, when it was pulled up in the (100) or (110) direction perpendicular to the C axis, small bubbles were included.

Processing

A (100), (001) face sample (approximately 30 mm by 30 mm by 40 mm) was prepared from the grown crystal.

Operation Tests

Figure 7:
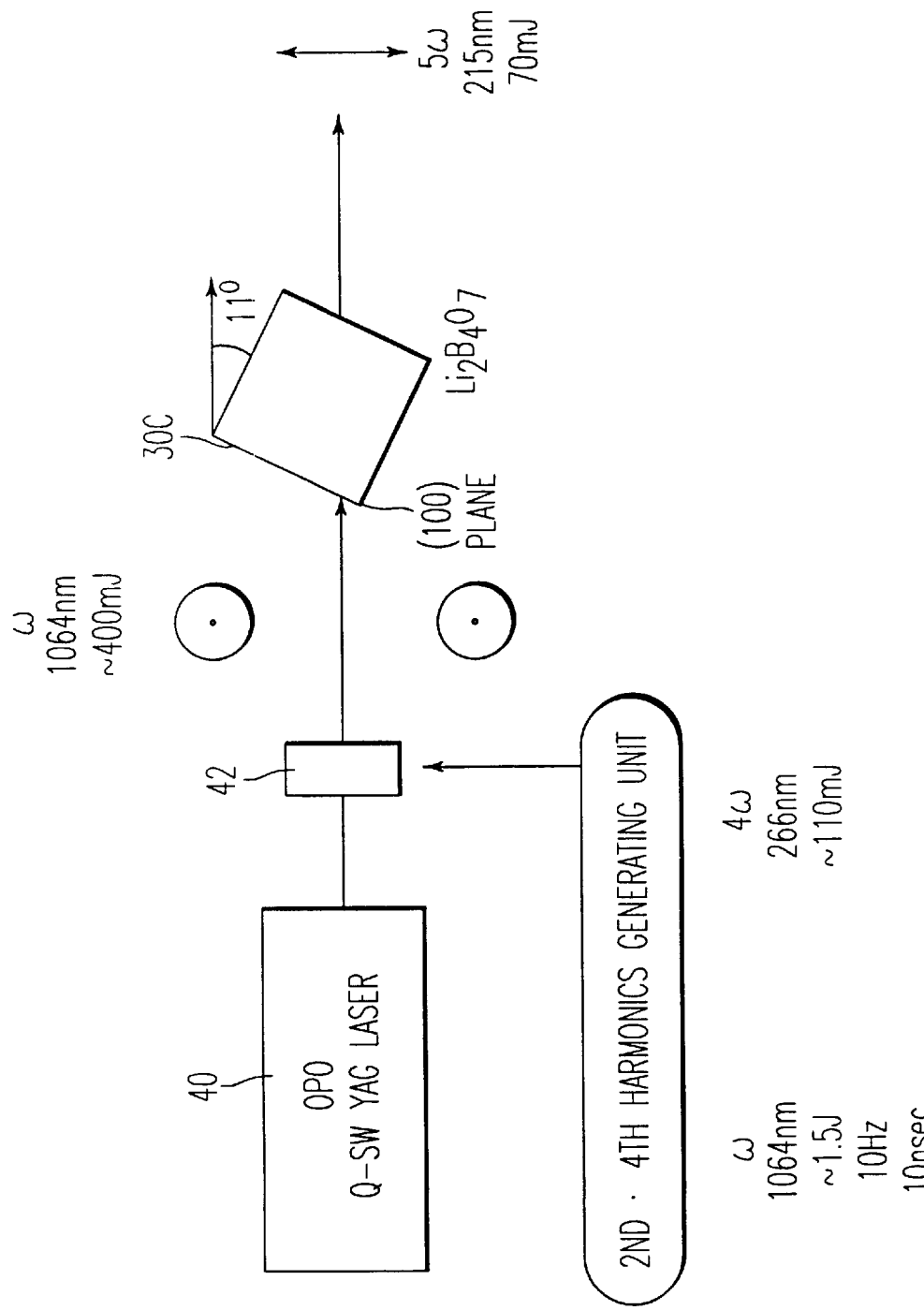
FIG. 7 is a schematic diagram illustrating a laser apparatus using a single-crystal LBO as a wavelength converter device for the fifth harmonic in Example 4 of the present invention.

A laser apparatus shown in FIG. 7, similar to the apparatus in FIG. 6, was used for experiments. The fundamental wave ω from a Nd:YAG laser (not shown in the figure) irradiated a 2nd & 4th harmonics generating unit 42, grand irradiated a wavelength converter device 30C using the single-crystal LBO of the present invention to generate the fifth harmonic light beam from the wavelength converter device 30C. The conditions were as follows: The output power of the fundamental wave of the Nd:YAG laser was 400 mJ; The output power of the fourth harmonic wave was 110 mJ. Irradiation occurred at a matching angle of 79°, at 10 Hz and 10 nsec, thereby generating a fifth harmonic wave of 70 mJ.

Light from an optical parametric oscillator irradiated a single-crystal LBO while rotating the crystal in the (001) direction, in which the wavelength of the irradiated light was changed gradually and the converter wavelength was measured. The minimum wavelength was 209 nm when the light was irradiated almost perpendicularly to the (100) plane sample.

As set forth above, laser oscillation which is variable in a wide wavelength range was observed in this laser apparatus using the single-crystal LBO of the present invention as the wavelength converter device 30C.

EXAMPLE 6

A further laser apparatus is explained using the single-crystal LBO of the present invention as a wavelength converter device for the fifth harmonic.

Single-Crystal Production

A single-crystal LBO was grown up with the pull-up equipment shown in FIG. 1 by the Czochralski method.

When the single-crystal LBO was pulled up in the C axis direction many bubbles were included, whereas, when it was pulled up in the (100) or (110) direction perpendicular to the C axis, small bubbles were included.

Processing

A grown crystal block was cut into a single-crystal LBO with a light incident face having the tilt of 79 degrees from the (001) plane. The size of the single-crystal was 20 mm by 20 mm by 45 mm.

Operation Test

Figure 8:
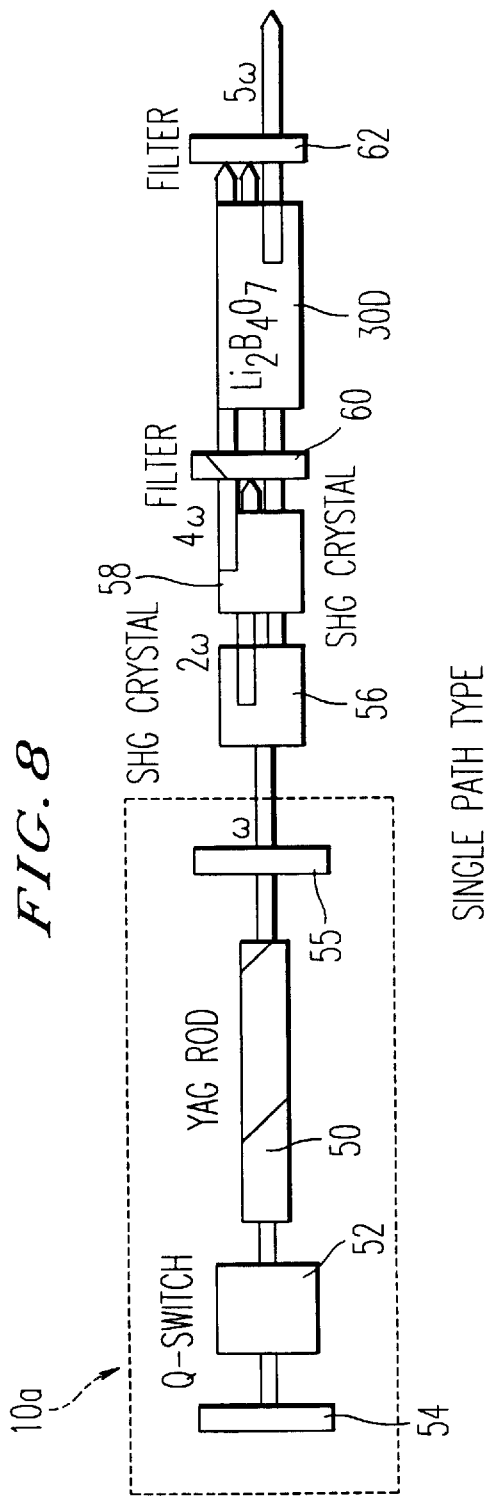
FIG. 8 is a single-pulse-type laser apparatus using a single-crystal LBO as a wavelength converter device in Example 5 of the present invention.

The single-crystal sample was provided as a wavelength converter device 30D between filters 60, 62 as shown in FIG. 8, a fundamental wave having a wavelength ω was emitted from a YAG laser 10a comprising a YAG rod 50, a Q switch 52, and mirrors 54, 55. The fundamental wave was passed through SHG crystals 56, 58, and the converted light irradiated the light incident face of the wavelength converter device 30D. SHG crystals 56, 58 are composed of single-crystal LBO or BBO, for example.

The single-crystal sample 30D cut at 79 degrees was placed on a stage and was rotated in the C axis direction as shown in FIG. 2. The generation of the fifth harmonic wave (5ω) was observed at 79±10 degrees.

The maximum intensity of the emitted light was 120 mJ when using a YAG laser (1.5 J, 10 Hz).

EXAMPLE 7

An optical-resonator-type laser apparatus using the single-crystal LBO of the present invention as a wavelength converter device is explained with reference to FIG. 9.

Single-Crystal Production

A single-crystal LBO was grown up with the pull-up equipment shown in FIG. 1 by the Czochralski method.

When the single-crystal LBO was pulled up in the C axis direction many bubbles were included, whereas when it was pulled up in the (100) or (110) direction perpendicular to the C axis, small bubbles were included.

Processing

A grown crystal block was cut into a single-crystal LBO with a light incident face having the tilt of 79 degrees from the (001) plane. The size of the single-crystal was 20 mm by 20 mm by 45 mm.

Operation Test

Figure 9:
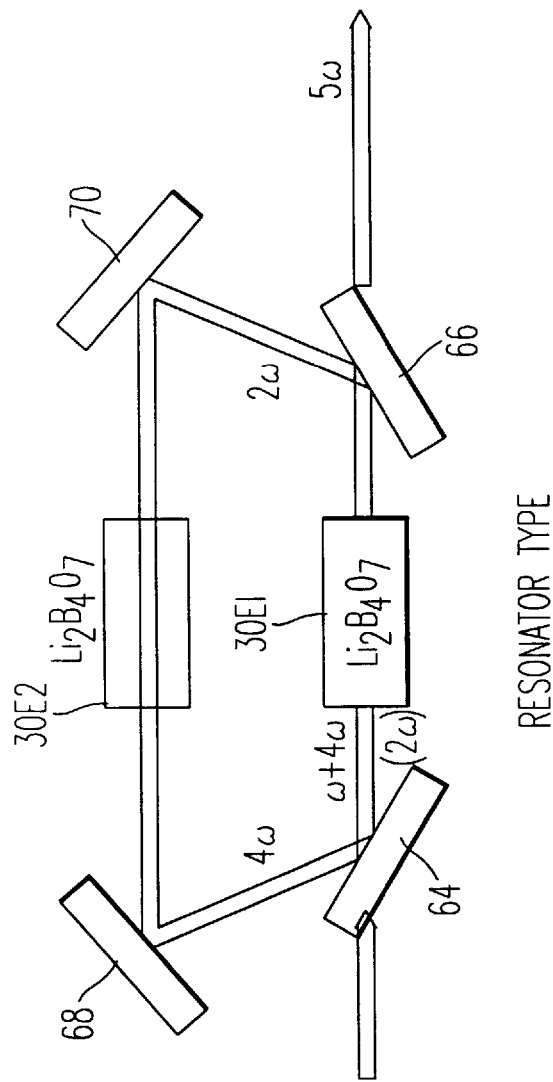
FIG. 9 is a single-pulse-type laser apparatus using a single-crystal LBO as a wavelength converter device in Example 6 of the present invention.

The resulting single-crystal samples were provided between mirrors 64, 66 and between mirrors 68, 70 as wavelength converter device 30E1, 30E2, as shown in FIG. 9.

The fundamental wave ω of 1,064 nm emitted from the half mirror 64 was converted into the second harmonic wave 2ω (532 nm) with the first wavelength converter device 30E1, the second harmonic wave 2ω was reflected with mirrors 66, 70 and irradiated the second wavelength converter device 30E2 having a cut face for converting the 532-nm wave in order to convert it into the fourth harmonic wave 4ω, the fourth harmonic wave 4ω was reflected with mirrors 68, 64 so that the wave again irradiates the wavelength converter device 30E1 in order to convert it into the fifth harmonic wave 5ω. The resulting fifth harmonic wave 5ω was emitted through the half mirror 66. The fundamental wave and the fourth harmonic wave were set to be always reflected by mirrors 64, 66, 68, 70. The wavelength converter device 30E1 of single-crystal LBO with a 79-degree cut face was placed on a stage and rotated in the C axis. The generation of the fifth harmonic-wave was observed at 79±10 degrees.

The maximum intensity of the emitted light was 200 to 300 mJ when using a YAG laser (1.5 J, 10 Hz) as an incident light source.

EXAMPLE 8

An optical parametric oscillator using the single-crystal LBO of the present invention as a wavelength converter device is explained with reference to FIG. 10.

Single-Crystal Production and Processing

A single-crystal LBO block produced with the pull-up equipment in FIG. 1 was cut so as to satisfy the phase matching angle for optical parametric oscillation, and the incident and emitting faces were optically polished to prepare a single-crystal LBO of the present invention having a size of 10 mm by 10 mm by 40 mm.

Construction

Figure 10:
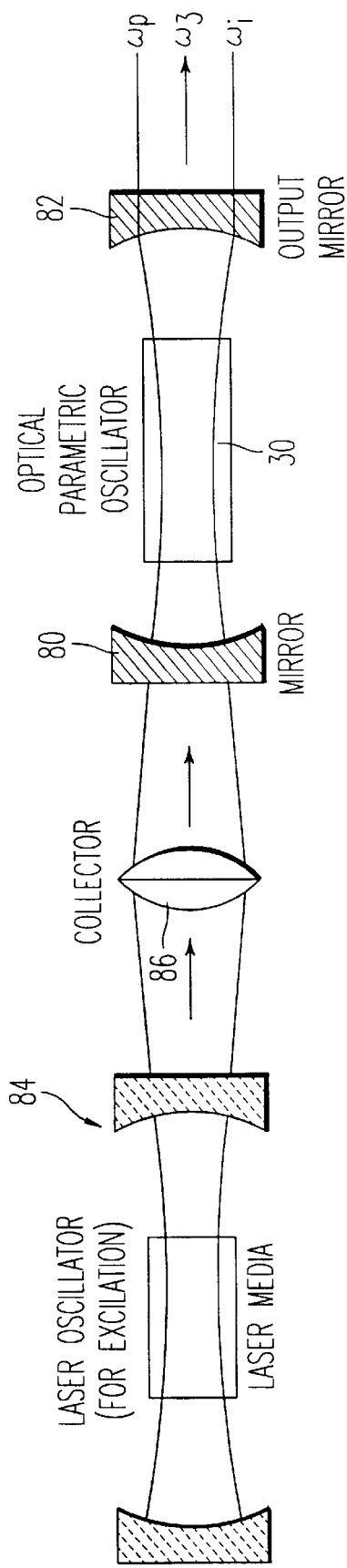
FIG. 10 is an optical parametric oscillator using a single-crystal LBO as a wavelength converter device in Example 7 of the present invention.

FIG. 10 is a block diagram illustrating a basic construction of an optical parametric oscillator using the single-crystal of the present invention. The optical parametric oscillator comprises an optical converter device 30F provided with an input mirror 80 and an output mirror 82 at both sides.

Operation Test

Light having a pumping frequency $\omega_p$ from a laser oscillator 84 comprising a YAG laser was irradiated onto the input mirror 80 through a collector 86.

In the optical parametric oscillator, mixing occurs between three kinds of waves, i.e., a wave having the pumping frequency $\omega_p$, a signal wave having the fundamental wavelength $\omega_s$, and an idler wave having an incident frequency $\omega_i=\omega_p-\omega_s$, the latter two waves are amplified in the single-crystal LBO media. Although the optical parametric oscillation is a kind of light mixing phenomenon, it essentially differs from general light mixing in that only one kind of incident wave is used in the optical parametric oscillation, while two kinds of incident waves are used in general color mixing. Further, in the optical parametric oscillation, a threshold exists because of the oscillation phenomenon. The fundamental frequency $f_s$ and the incident frequency $\omega_i$ are determined by external factors, such as a resonator and phase matching, regardless of the inherent frequency of the material.

When the wavelength converter device 30F of the single-crystal LBO of the present invention is placed in the signal or idler wave of the light wavelength region, or an optical resonator resonant with both waves, and when the intensity of the pumping wave reaches a given threshold, the signal and idler waves are generated at the same time by the gain of the optical parametric amplification. The threshold corresponds to a value at which the optical parametric gain equals the losses of the signal and idler waves.

Laser light having a continuously variable wavelength in a wide wavelength range can be obtained as follows: The incident angle to the wavelength converter device 30F of single-crystal LBO is changed by adjusting the optical parametric oscillator. Alternately, the temperature of the wavelength converter device 30F is changed. Thus, this optical parametric oscillator using the single-crystal LBO as a wavelength converter device has a practical significance.

Light of the fourth harmonic ($4\omega=266$ nm) of the YAG with a pulse width 10 sec., which was emitted from the laser oscillator 84 comprising the YAG laser, was irradiated onto the input mirror 80 through the collector 86. As a result, a mixing phenomenon occurred between three waves, i.e., the fourth harmonic waves (266 nm) of the YAG laser, the signal wave of 355 nm, and the idler wave of 1,061 nm, where the signal and idler waves are amplified in the optical converter device 30F.

No color center was observed in the optical converter device 30F of the single-crystal LBO after 100-hours operation. The color center represents transparent spot defects inside the crystal which is detected by the generation of the absorbance band in the single-crystal.

Signal and idler waves which have continuously variable wavelengths were obtained by changing the incident angle to the optical converter device 30F or by changing the temperature of the single-crystal LBO of the optical converter device 30F.

The optical parametric oscillator using the single-crystal LBO in EXAMPLE 8 has a higher resistivity to laser damage compared with that using BBO. Thus this optical parametric oscillator can receive the high power YAG laser and can emit high power, continuously variable, short-wavelength laser light. Further, since the single-crystal LBO has an excellent durability to ultraviolet light, the optical converter device using the single-crystal LOB has a longer life.

EXAMPLE 9

Another optical parametric oscillator using the single-crystal LBO of the present invention as a wavelength converter device is explained.

Optical parametric oscillation was carried out in the same manner as described in EXAMPLE 8 illustrated in FIG. 10, except that the fifth harmonic wave ($5\omega$: 213 nm) of the YAG laser was used as light irradiated onto the optical parametric oscillator.

As a result, a mixing phenomenon occurred between three waves, i.e., the fifth harmonic waves (213 nm) of the YAG laser, the signal wave of 300 nm, and the idler wave of 734 nm, where the signal and idler waves are amplified in the single-crystal LBO medium.

No color center was observed in the optical converter device of the single-crystal LBO after 100-hours operation.

Signal and idler waves which have continuously variable wavelengths were obtained by changing the incident angle to the single-crystal LBO (by means of the adjustment of the optical parametric oscillation) or by changing the temperature of the crystal.

Comparative Example 4

Optical parametric oscillation was carried out in the same manner as described in EXAMPLE 8, except that BBO single-crystal, instead of the single-crystal LBO, was used as the optical converter device 30F. The color center as the result of the crystal deterioration was observed after 100-hours of operation.

Although a single-crystal LBO having a small transition density was used in EXAMPLEs 8 and 9, a conventional single-crystal LBO used for SAW also does not have a color center. Of course, the single-crystal LBO of the present invention having a low refractive index variation and a low transition density is preferably used in comparison to the conventional single-crystal LBO.

EXAMPLE 10

A laser apparatus for lithography is now explained with reference to FIG. 11, to which the wavelength converter device using the single-crystal LBO of the present invention is applied.

Single-Crystal Production

A single-crystal LBO was grown up in the (110) pull-up direction with the pull-up equipment 110 shown in FIG. 1.

The grow-up conditions were as follows: The temperature gradient between the melt surface and a position of just 10 mm above the melt was 80° C./mm; The temperature gradient above the position was 30° C./mm; the pull-up speed of the single-crystal LBO body was 0.5 mm/hour; The rotation of the seed crystal was 2 rpm. A single-crystal LBO rod having a diameter of 2 inches and a length of 120 mm was obtained.

Processing

The resulting single-crystal LBO rod was cut into a block of 10-mm by 10-mm by 30-mm while tilted by 79 degrees from the C axis, and both the incident and emitting face were optically polished.

Configuration of Apparatus

A laser apparatus for lithography comprises a wavelength converter device 221 of the formed single-crystal LBO block provided with mirrors 222A, 222B at its both sides, and a lens system 224 provided in front of the input side mirror 222A, and a filter 226 and integrator 228 provided at the rear of the output side mirror 222B. The filter 226 is used for separating light other than those having desirable wavelengths.

The integrator 228 may include; for example, that in which small convex or concave lenses are uniformly formed on the one or both side(s) of the optical lens; that in which small convex or concave lenses are uniformly formed on the one or both side(s) of the optical glass; and that comprising the combination of lenses such as a dragonfly eye. The integrator 228 can be omitted in the laser apparatus of the present invention.

Operation Tests

When a light beam of a fourth harmonic wave 4ω (266 nm) of the light (1,064 nm) from a YAG laser (500 Hz, 100 mJ) and a light beam having a frequency ω from a YAG laser (400 mJ) irradiated the wavelength converter device 221 (30G) at the same time through the lens system 224, an ultraviolet beam (30 mJ) of fifth harmonic wave 5ω of the light emitted from the YAG laser was emitted by mixing of the two light beams i.e., sum frequency generation. After light having frequencies other than the desired wavelength was removed with the filter 226, the intensity distribution of the desired light was smoothed with the integrator 228.

No color center formed in the wavelength converter device of LBO crystal after this state was maintained for 100 hours or more. The color center represents transparent spot defects inside the crystal which are detected by the generation of the absorbance band in the single-crystal.

Examples of the light sources for lithography, other than the optical parametric oscillator, include Nd:YAG, Nd:YVO$_4$, Cr:LiSAF, ruby laser, glass laser, alexandrite laser, garnet laser, sapphire laser, and semiconductor laser.

Comparative Example 5

Figure 11:
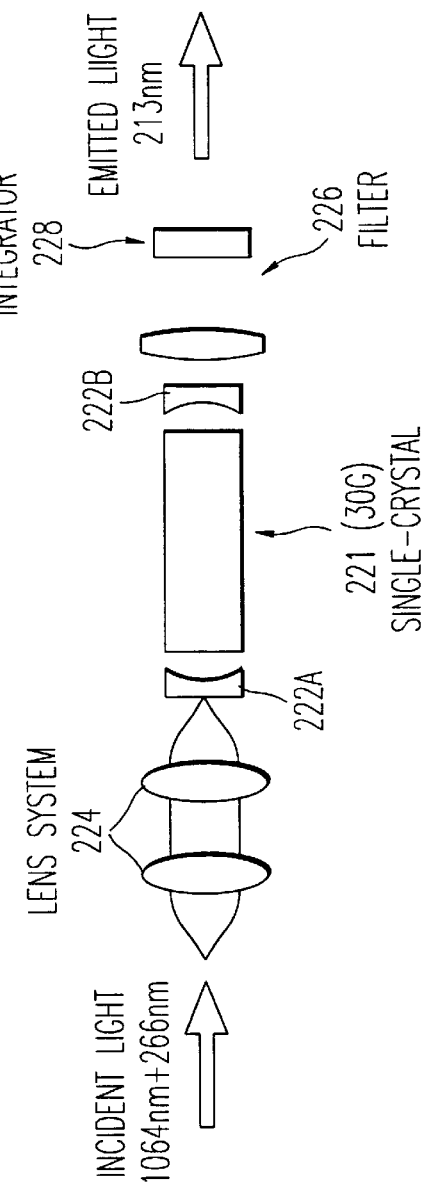
FIG. 11 is a laser apparatus for lithography using a single-crystal LBO as a wavelength converter device in Example 8 of the present invention.

By using BBO block of 5 mm by 5 mm by 5 mm as a wavelength converter device, a laser apparatus as shown in FIG. 11 was constructed and subjected to durability tests like EXAMPLE 10.

Ultraviolet light of a fifth harmonic wave 5ω of the light emitted from a YAG laser (25 mJ) was observed in the laser apparatus using BBO. However, the allowable ranges of the phase matching angle and temperature are small. Further BBO is heated because of the ultraviolet light absorption. Thus, it is extremely difficult to generate high power fourth harmonic waves (4ω) and fifth harmonic waves (5w) which are stable for a long time. The deterioration of the crystal as a color center was observed after 100 hours operation. Accordingly, it was confirmed that BBO is unsuitable for the laser apparatus for lithography requiring long term stability. Further, BBO readily includes impurities and the yield is low because of flux growing, resulting in an increase in production costs.

EXAMPLE 11

A high power short wavelength solid-state laser apparatus for processing is now explained with reference to FIG. 12, as an example of the application of the wavelength converter device using the single-crystal LBO of the present invention.

The single-crystal LOB can generate a highly coherent fourth harmonic wave (266 nm) and fifth harmonic wave (213 nm) from the light (1,064 nm) emitted from a Nd:YAG laser, according to the present inventors' investigation. The fifth harmonic wave (213 nm) is shorter than the KrF excimer laser (248 nm). By generating the fourth or fifth harmonic wave from infrared laser light emitted from an existing high power apparatus, laser light of ultraviolet and its neighboring regions can be readily obtained. Abrasion processing can be achieved by using the laser light.

Two or more kinds of laser light beams can also irradiate the single-crystal LBO at the same time to generate a laser light beam of the sum or difference frequency of these light beams.

Single-Crystal Production

A single-crystal LBO having sizes of 2 inches or more in the (001), (110 ) and (100) directions were grown up with the pull-up equipment shown in FIG. 1.

The grow-up conditions were as follows: The temperature gradient between the melt surface and a position just 10 mm above the melt was 80° C./mm; The temperature gradient above the position was 30° C./mm; The pull-up speed of the single-crystal LBO body was 0.5 mm/hour; The rotation of the seed crystal was 2 rpm.

Processing

The resulting single-crystal LBO was cut into a block of 20-mm by 20-mm by 50-mm while tilted by 79 degrees from the C axis, and both the incident and emitting face were optically polished.

Apparatus Configuration

Figure 12:
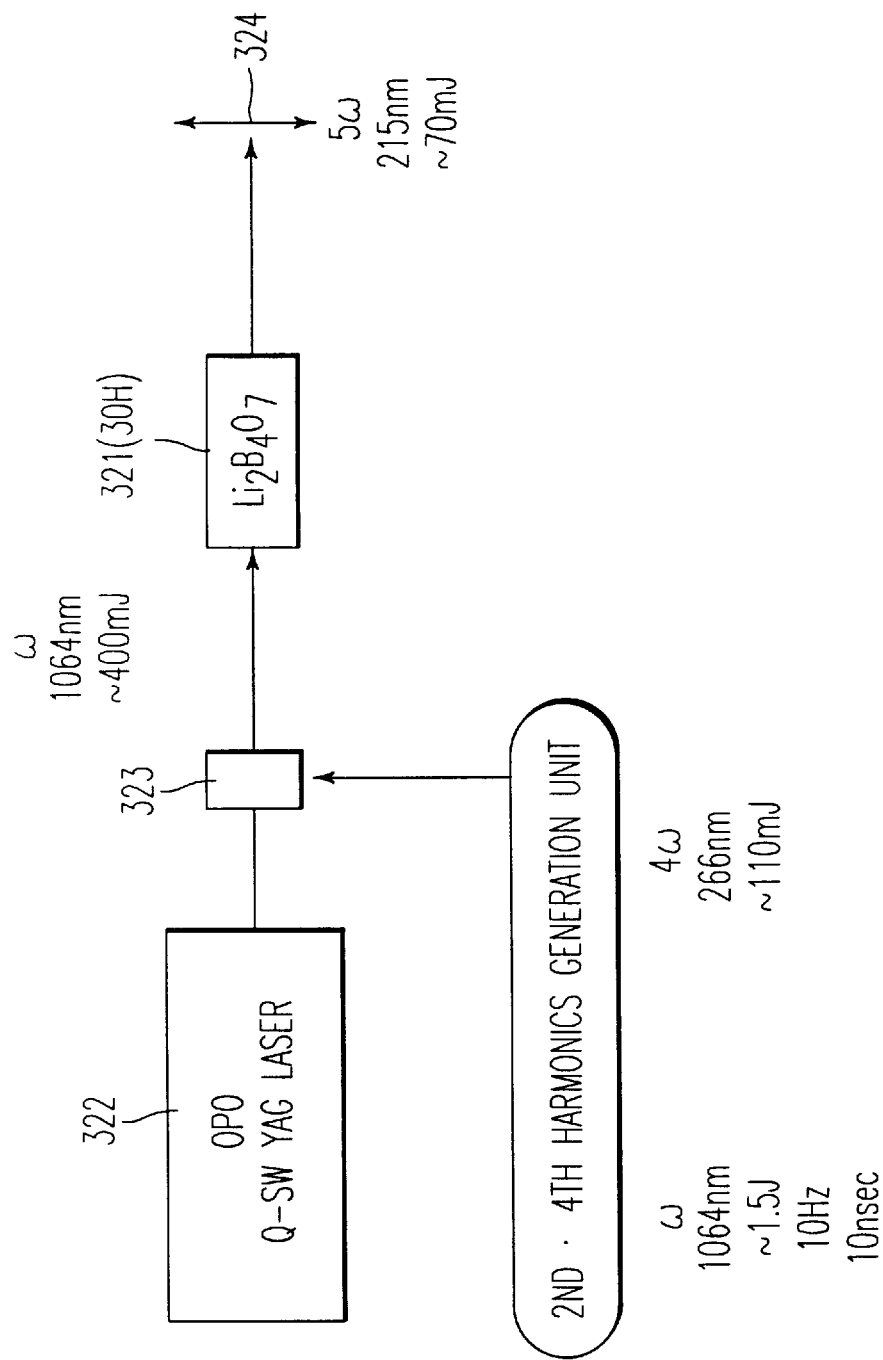
FIG. 12 is a short wavelength solid-state laser apparatus for processing using a single-crystal LBO as a wavelength converter device in Example 9 of the present invention.

As shown in FIG. 12, a wavelength converter device 321 (30H) comprising the resulting block single-crystal LBO was provided in front of a YAG laser 322 (1.5 J, 1 HKz, 10 sec.) and a 2nd & 4th harmonics generation unit 323.

Operation Tests

A 90-mJ light beam having a frequency 4ω (266 nm) and a 850-mJ light beam having a frequency ω (1,064 nm) are generated by passing a 1.5-J laser light of 1,064 nm from the YAG laser through the 2nd & 4th harmonics generation unit 323. When these light beams passed through the wavelength converter device 321 comprising the single-crystal LBO, a 20-mJ ultraviolet light beam of 5ω (213 nm) was generated by the sum frequency generation of the two light beams. Undesired light was eliminated with a filter such as a prism to irradiate only the desired light (5ω) onto a 1-mm thick glass plate 324.

The abrasion of the glass was observed by the bloom at the section of the glass which was irradiated with the fifth harmonic wave light. After two or three minutes, the fifth harmonic wave light formed a through-hole. The wavelength converter device 321 worked without problem or failure during the operation.

In EXAMPLE 11, a non-reflective coating was not applied to the polished face of the single-crystal LBO. The output power of the fifth harmonic wave can still further increase by non-reflective coating.

Examples of the light sources for processing, other than the example set forth above, include Nd:YVO$_4$, Cr:LiSAF, ruby laser, glass laser, alexandrite laser, garnet laser, sapphire laser, and semiconductor laser.

Comparative Example 6

By using BBO block of 5 mm by 5 mm by 5 mm as a wavelength converter device, a laser apparatus as shown in FIG. 12 was constructed and subjected to the abrasion working like EXAMPLE 11.

Ultraviolet light (15 mJ) of a fifth harmonic wave 5ω was observed in the laser apparatus using BBO. However, the allowable ranges of the phase matching angle and temperature are small. Further BBO is heated because of the ultraviolet light absorption. Thus, it is extremely difficult to generate high power fourth harmonic waves (4ω) and fifth harmonic waves (5ω) which are stable for a long time. The deterioration of the crystal as a color center was observed after 100 hours operation. Accordingly, it was confirmed that BBO is unsuitable for the laser apparatus for processing requiring long term stability. Further, BBO readily includes impurities and the yield is low because of flux growing, resulting in increases in production costs. The single-crystal LBO of the present invention can solve such problems.

The single-crystal LBO is inferior to the BBO single-crystal in its non-linear optical constant. On the other hand, a large size single-crystal LBO can be grown up. Since the wavelength converting efficiency is proportional to the square of the input power and the square of the crystal length, the single-crystal LBO, of which a larger single-crystal is available, has a higher wavelength converting efficiency, as a result.

The resistivity to laser damage of the single-crystal LBO is at least 10 times higher than that of BBO, thus a high power laser can be irradiated onto the single-crystal LBO. Further, no color center occurs in the single-crystal LBO by long term irradiation with ultraviolet rays. Accordingly, the laser apparatus using the wavelength converter device comprising this single-crystal LBO can be preferably used as a short wavelength solid-state laser apparatus for processing.

EXAMPLE 12

An optical converter device comprising single-crystal LBO ($Li_2B_4O_7$) containing a laser-oscillation-activating device will be explained.

Features

An optical apparatus in EXAMPLE 12 uses a nonlinear optical device which acts as both a wavelength converting material and a laser oscillating material, resulting in the miniaturization of the apparatus. The nonlinear optical device has a high wavelength converting efficiency and a high resistivity to laser damage, and a large size single-crystal can be grown up.

The present inventors have found that the single-crystal $Li_2B_4O_7$ as the wavelength converter device preferably contains a laser-oscillation-activating device. Examples of the laser-oscillation-activating element include rare earth elements, such as Nd, Tm and Er. A desired material characteristic or crystal characteristic can be achieved by changing the kind id and/or amount of the laser-oscillation-activating device. According to the experimental results, the amount to be added is preferably 0.01 to 10 weight percent.

Since the laser-oscillation-activating device in the single-crystal LBO enhances the laser oscillation function of this single-crystal, a compact laser apparatus will be readily achieved. Further, laser oscillation and wavelength conversion proceed in the entire crystal, and thus the single-crystal LBO acts as a resonator, resulting in improvement in wavelength conversion efficiency. Moreover, the phase matching can be readily adjusted.

The non-linear optical material of the present invention can emit a laser light beam having a novel wavelength by mixing two light beams among an exciting light beam (wavelength $\lambda_1$), an oscillating light beam (wavelength $\lambda_2$) emitted by the excitation, and a second harmonic generation light beam (wavelength $\lambda_3$). The wavelengths of the exciting and oscillating light beams vary with the added dopant as an activator of laser oscillation, such as Nd, Tm, Er, Pr, or U. The wavelength of the emitted laser light can be appropriately determined. For example, a laser light beam can be generated by mixing the following three light beams; a semiconductor laser light beam (wavelength 804 nm) as excitation light, a fundamental light beam (wavelength 1,064 nm) emitted from a Nd-containing single-crystal $Li_2B_4O_7$ (Nd:LBO) excited by the semiconductor laser; and a SHG light beam (wavelength 532 nm). By adding the semiconductor laser (wavelength 804 nm) and the fundamental laser (wavelength 1,064 nm), a laser light beam of 458 nm is obtained (sum frequency generation: $1/\lambda_1 + 1/\lambda_2$). Alternately, a laser light beam of 1573 nm is obtained by differential frequency generation of the semiconductor laser of 804 nm and the YAG·SHG light of 532 nm.

The single-crystal LBO is inferior to the BBO single-crystal with respect to the non-linear optical constant. On the other hand, a large size single-crystal LBO can be grown up. Since the wavelength converting efficiency is proportional to the square of the input power and the square of the crystal length, the single-crystal LBO, of which a larger single-crystal is available, has a higher wavelength converting efficiency, as a result. The resistivity to laser damage of the single-crystal LBO is at least 10 times higher than that of BBO, thus a high power laser can irradiate the single-crystal LBO. Further, no color center occurs in the single-crystal LBO by long term irradiation with ultraviolet rays.

Single-CrYstal-Production

A single-crystal LBO containing a laser-oscillation-activating device was grown up from molten LBO containing a laser-oscillation-activating device in the platinum crucible 101 using the pull-up equipment shown in FIG. 1.

The grow-up conditions were as follows: The temperature gradient between the melt surface and a position just 0.1 cm above the melt was 30° to 200° C./mm; The temperature gradient above the position was 10° to 50° C./mm; The pull-up speed of the single-crystal LBO body was 1 to 2 mm/hour. Examples of dopants as activators of laser oscillation include rare earth elements such as Nd, Tm and Er. The amount of such a device 2 in the single-crystal is preferably 0.01 to 10 weight percent. The weight percent in the added device is 100 percent of the stoichiometric composition of the crystal.

EXAMPLE 12—NO. 1

A laser-diode-excitation-type apparatus of the present invention is explained with reference to FIG. 13.

A single-crystal LBO containing 1-weight-percent Nd as an activator was grown up using the pull-up equipment shown in FIG. 1. The platinum crucible 101 was filled with 1300 g of polycrystalline LBO with 1 weight percent of Nd, the content was melted, and the single-crystal LBO was pulled up in the (110 ) pull-up direction.

The grow-up conditions were as follows: The temperature gradient between the melt surface and a position of just 10 mm above the melt was 80° C./mm; The temperature gradient above the position was 30° C./mm; The pull-up speed of the single-crystal LBO body was 0.5 mm/hour; The rotation of the seed crystal was 2 rpm. A single-crystal LBO having a diameter of 2 inches and a length of 120 mm was obtained, as a result.

The resulting single-crystal LBO was cut into a block so as to satisfy a phase matching angle $\theta_m$ of approximately 33 degrees, and both the incident and emitting face were optically polished. The laser block has a diameter of 10 mm and a length of 100 mm. The both end faces are coated to form a resonator.

Figure 13:
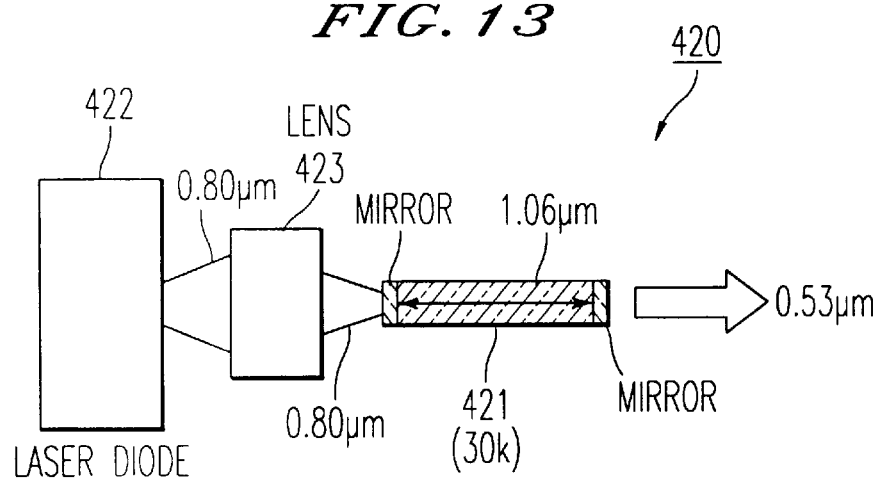
FIG. 13 is a laser-diode-excitation-type laser apparatus comprising a single-crystal LBO as a non-linear optical material in Example 10 of the present invention.

As shown in FIG. 13, a laser-diode-excitation-type laser apparatus 420 comprises the laser block 421 (30I) comprising the shaped single-crystal LBO.

When a laser light beam (output power 2 W) from a laser diode 422 which emits 0.80-$\mu$m light irradiated the laser block 421 through a focusing lens 423, the laser block 421 resonated by oscillation of 1.06-$\mu$m light,-and a green second harmonic wave of 0.53 $\mu$m (530 nm) was emitted. The output power of the emitted light was 0.008 W, and thus the converting efficiency of the laser block was 0.4%.

EXAMPLE 12—NO. 2

Another laser-diode-excitation-type apparatus of the present invention will be explained with reference to FIG. 13.

A single-crystal LBO containing 0.5-weight-percent Er as an activator was grown up using the pull-up equipment shown in FIG. 1, wherein platinum crucible 101 was filled with 1300 g of polycrystalline LBO with 0.5 weight percent of Er.

As shown in FIG. 13, a laser-diode-excitation-type laser apparatus 420 comprises the laser block 421 (30I) comprising the shaped single-crystal LBO containing Er. When a laser light beam from a laser diode 422 irradiated laser block 421 in the same condition as EXAMPLE 12 NO. 1, the laser block 421 was resonated by oscillation of 1.06-$\mu$m light, and a green second harmonic wave of 0.53 $\mu$m (530 nm) was emitted. The output power of the emitted light was 0.006 W, and thus the converting efficiency of the laser block was 0.3%.

EXAMPLE 12—NO. 3

Figure 14:
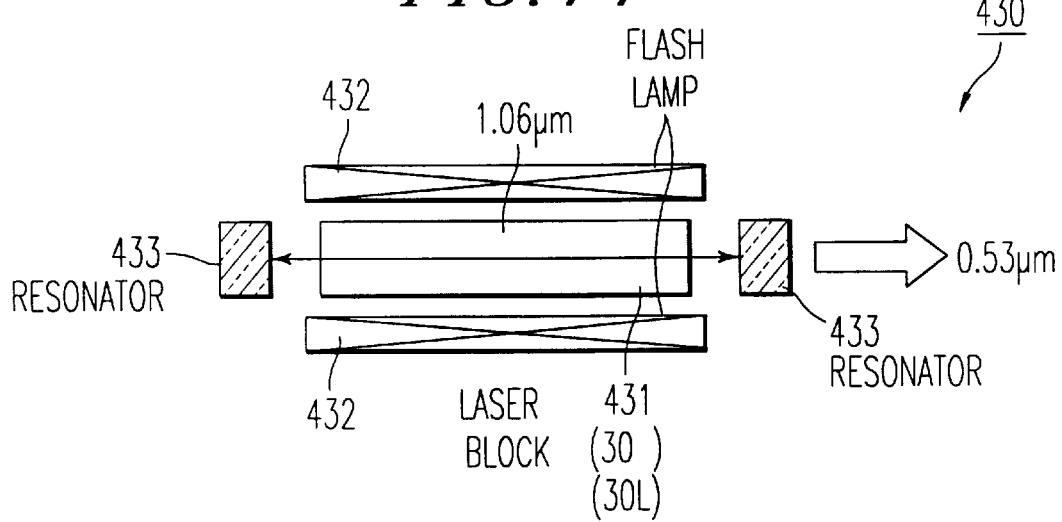
FIG. 14 is a flash-lamp-excitation-type laser apparatus comprising a single-crystal LBO as a non-linear optical material in Example 11 of the present invention.

A flash-lamp-excitation-type apparatus of the present invention is explained with reference to FIG. 14.

A single-crystal LBO containing 1-weight-percent Nd and 1-weight-percent Cr as activators was grown up from polycrystalline LBO containing Nd and Cr, using the pull-up equipment shown in FIG. 1. As shown in FIG. 14, a flash-lamp-excitation-type laser apparatus 430 comprises laser block 431 (30J) comprising the shaped single-crystal LBO containing Nd and Cr. The shape and size of the laser block 431 are the same as EXAMPLE 12 NO. 1. When a laser light beam (1,000 W) from a flash-lamp 432 irradiated the laser block 431, the laser oscillated by excitation with the flash lamp, a light of 1.06-$\mu$m (1,060 nm) resonated with resonating mirrors 433, and a green second harmonic wave of 0.53 $\mu$m (530 nm) was emitted. The output power of the emitted light was 1 W, and thus the converting efficiency of the laser block 431 was 0.1%.

EXAMPLE 12—NO. 4

Another flash-lamp-excitation-type apparatus of the present invention is explained with reference to FIG. 14.

A single-crystal LBO was grown up from polycrystalline LBO containing Er and Cr, using the pull-up equipment shown in FIG. 1. As shown in FIG. 14, a flash-lamp-excitation-type laser apparatus 430 comprises the laser block 431 (30L) comprising the shaped single-crystal LBO containing Er and Cr. When a laser light beam (1,000 W) from a flash-lamp 432 irradiated the laser block 431 (30L), the laser oscillated by excitation with the flash lamp, a light of 1.06-$\mu$m (1,060 run) resonated with resonating mirrors 433, and a green second harmonic wave of 0.53 $\mu$m (530 nm) was emitted. The output power of the emitted light was 0.8 W, and thus the converting efficiency of the laser block 431 was 0.8%.

EXAMPLE 12—NO. 5

Figure 15:
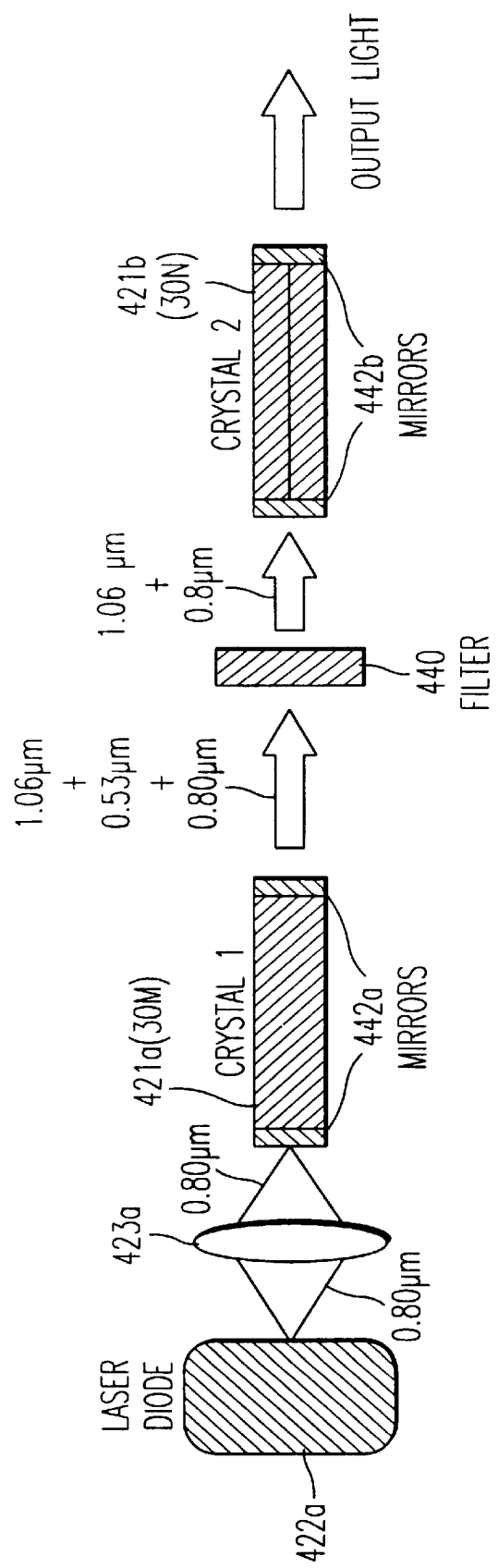
FIG. 15 is a laser diode-excitation-type laser apparatus comprising a single-crystal LBO as a non-linear optical material in Example 12 of the present invention.

A flash-lamp-excitation-type apparatus of the present invention is explained with reference to FIG. 15.

In this example, an interesting light beam is obtained by mixing three light beams; the excitation light having a wavelength $\lambda_1$, a light having a wavelength $X_2$ generated by the excitation, and a SHG light (a wavelength $\lambda_1$) of the light having a wavelength $\lambda_2$. The excitation wavelength and oscillation wavelength vary with the added activation device for the laser oscillation, e.g. Nd, Er, Pr, and U. For example, among three light beams of a light beam having a wavelength of 804 nm from the semiconductor laser, a fundamental wave of 1,064 nm and a SHG light beam (532 nm) of the fundamental wave, both of which waves are generated in a Nd:Li$_2$B$_4$O$_7$ by the semiconductor laser excitation, the SHG light beam (532 nm) being removed with a filter 440. The residual two beams irradiate a laser block 421b (30N) comprising single-crystal LBO. An interesting light beam of 458 ran is obtained by the sum frequency generation of these two light beams (sum frequency generation: $1/\lambda_1+1/\lambda_2=1/\lambda_3$. Similarly, a light beam of 1,573 nm is obtained by differential frequency generation of the light of 804 nm from the semiconductor laser and the SHG light of 532 run from the YAG.

EXAMPLE 13

Figure 16A:
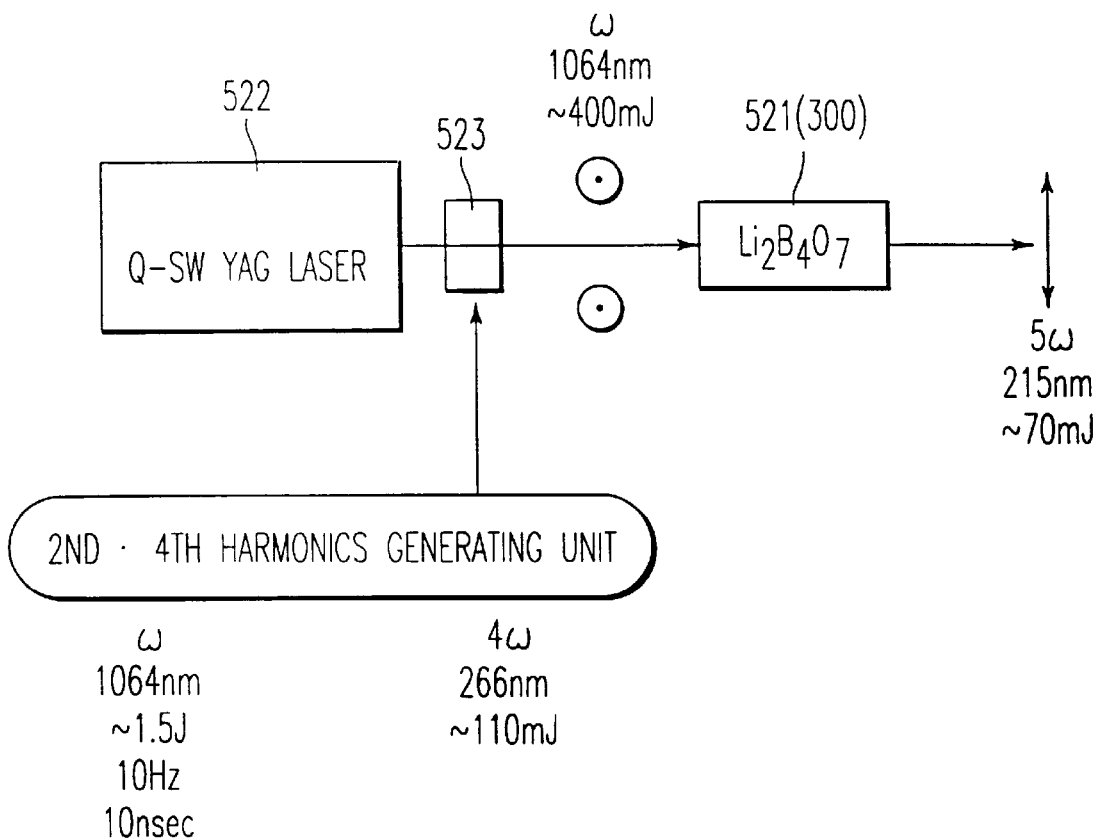
FIG. 16A is a block diagram illustrating a laser apparatus using a single-crystal LBO as a non-linear optical material in Example 13 of the present invention.

An example, in which the single-crystal Li$_2$B$_4$O$_7$ (single-crystal LBO) of the present invention is used for another laser apparatus, is explained with reference to FIGS. 16A and 16B.

Principle

The present inventors have found that a twinning crystal of the single-crystal LBO (not ferroelectric material) of the present invention causes a phenomenon like quasi-phase matching (QPM) and thus can convert an incident light with a high efficiency. The QPM represents a wavelength converting method in which the C+ axis is rotated by 180 degrees by the twinning crystal of the single-crystal LBO. The QPM has some advantages. First, the phase matching wavelength can be freely determined by varying the periodic length. Further, the phase matching wavelength region can be extended by setting a plurality of periods by means of the twinning crystal. Moreover, the allowable temperature range requiring for the phase matching can be extended to twice or more by using the twinning crystal of the single-crystal LBO. The twinning crystal can be used either in a bulk state or as a waveguide. Additionally, a nonlinear optical constant d (33) can be used. Since the QPM is prepared by rotating the C+ axis direction by 180 degrees by means of the twinning crystal, it has been thought that this is applicable to only ferroelectric materials. However, the present inventors have found that this is also applicable to a paraelectric material of single-crystal LBO.

The nonlinear optical device using the single-crystal LBO of the present invention has a monolithic structure in which right-hand crystals and left-hand crystals alternately pile up, wherein both crystals have different rotation directions of spiral axes in the C axis direction. Each of such crystals are a single-crystal, for example.

In piezoelectric crystals having a spiral axis in the C axis direction, so-called right-hand crystals and left-hand crystals exist by the rotation direction of the spiral. These right-hand and left-hand crystals often form a twinning crystal with composite planes other than the C axis. only the C+ direction rotates by 180 degrees at the composite plane boundaries of these crystals. Thus, each crystal in the twinning crystal has a mutually reversed nonlinear optical constant. By preparing alternately right-hand crystals and left-hand crystals, the sign of the nonlinear optical constant can be reversed. Thus, the QPM structure, like the polarization reversion in the ferroelectric crystal, can be formed with a paraelectric crystal. Such a paraelectric twinning crystal can be prepared by thin film growing or bulk growing with a special skill, and piling up of thin crystals. Such a twinning crystal has the basic features of the QPM as follows: The phase matching wavelength can be freely determined by varying the periodic length. Further, the phase matching wavelength region can be extended by setting a plurality of periods by means of the twinning crystal. Moreover, the allowable temperature range required for the phase matching can be extended to twice or more by using the twinning crystal of the single-crystal LBO. The twinning crystal can be used either in a bulk state or as a wave-guide. Additionally, a nonlinear optical constant d (33) can be used.

As set forth above, the nonlinear optical device of the present invention generates a quasi-QPM phenomenon and the wavelength of the incident light can convert with a high efficiency. In particular, the single-crystal LBO can generate a highly coherent fourth harmonic wave (266 nm) and fifth harmonic wave (213 nm) from a Nd:YAG laser (1,064 nm), for example. The fifth harmonic wave is shorter than that in the excimer laser (248 nm). By generating the fourth or fifth harmonic wave from infrared laser light emitted from an existing high power apparatus, laser light of ultraviolet wavelengths and its neighboring regions can be readily obtained. It can be applied to various fields, such as marking, lithography, semiconductor processing, and medical applications. In particular, a high power laser apparatus for converting the incident light with a high efficiency can be obtained by providing alternately twinning crystals in the single-crystal LBO and by generating a quasi-QPM phenomenon.

Since a large size of single-crystal LBO can be grown up, a large size of a nonlinear optical device is readily produced. Further, high power laser can be irradiated onto the single-crystal LBO because of the high resistivity to laser damage. Moreover, the device has a prolonged life due to a decreased deterioration by ultraviolet rays.

Single-Crystal Production

Using the pull-up equipment shown in FIG. 1, a single-crystal LBO containing alternately twinning crystals can be prepared. Polycrystalline LBO (1,300 g) was placed and melted in the platinum crucible 101, and then a single-crystal LBO having a diameter of 2 inches or more was pulled up in the (001), (110 ) and (100) directions.

The grow-up conditions were as follows: The temperature gradient between the melt surface and a position of just 10 mm above the melt was 80° C./mm; The temperature gradient above the position was 30° C./mm, the pull-up speed of the single-crystal LBO body was 0.5 mm/hour; The rotation of the seed crystal was 2 rpm. A seed crystal formed by alternately piling up right-hand crystals and left-hand crystals was used.

Processing

The resulting single-crystal LBO was cut into a block (20 mm by 20 mm by 50 mm) by tilting by 79 degrees so that the pile-up direction of the right-hand crystals and the left-hand crystals agrees with the longitudinal direction, and both the incident and emitting face were optically polished. In such a manner, a nonlinear optical device 521 comprising a single-crystal LBO block, in which right-hand crystals 521a and left-hand crystals 521b are alternately piled up, was obtained. The distance between the composite planes in the twinning crystal is preferably approximately a few μm to a few dozen μm.

Apparatus Configuration and Operation

The nonlinear optical device 521 (300) comprising the resulting single-crystal LBO block was provided in front of a YAG laser 522 (output power: 1.5 J, 10 Hz, 10 sec.) and a 2nd & 4th harmonics generating unit 523.

When a laser light beam having a wavelength of 1,064 nm and an output power of 1.5 J generated by a YAG laser passed through the 2nd & 4th wave generating unit 523, a light beam having a wavelength of 4ω (266 nm, output power: 110 mJ) and a light beam of wavelength ω (1,064 nm, output power: 400 mJ) were generated. When these light beams passed through the nonlinear optical device 521 comprising the single-crystal LBO, an ultraviolet light beam of wavelength 5ω (213 nm, output power: 150 mJ) was generated by sum frequency generation of these two light beams.

No extraordinary state was observed in the nonlinear optical device 521 comprising the single-crystal LBO during the operation.

In EXAMPLE 13, non-reflective coating was not applied to the polished face of the single-crystal LBO. The output power of the fifth harmonic wave further increases by non-reflective coating.

The present invention is not limited EXAMPLES set forth above, and thus various modification can be available within the scope of the present invention. For example, the light sources, other than the example set forth above, include Nd:YVO$_4$, Cr:LiSAF, ruby laser, glass laser, alexandrite laser, garnet laser, sapphire laser, and semiconductor laser.

Although the nonlinear optical device 521 comprises a bulk single-crystal LBO containing twinning crystals in which right-hand crystals and left-hand crystals are alternately piled up in EXAMPLE 13, an optical waveguide single-crystal LBO also can be used as the nonlinear optical device 521. Further paraelectric crystals, e.g. quartz and the like, as well as the single-crystal LBO, can be used in the present invention.

REFERENCE 4

Sum frequency generation was carried out in the same manner as described EXAMPLE 13, except that a block single-crystal LBO not containing twinning crystals (20 mm by 20 mm by 50 mm) was used as a nonlinear optical device. An ultraviolet light beam of 5ω (213 nm) was generated in an output power of 70 mJ.

Comparative Example 7

Figure 16B:
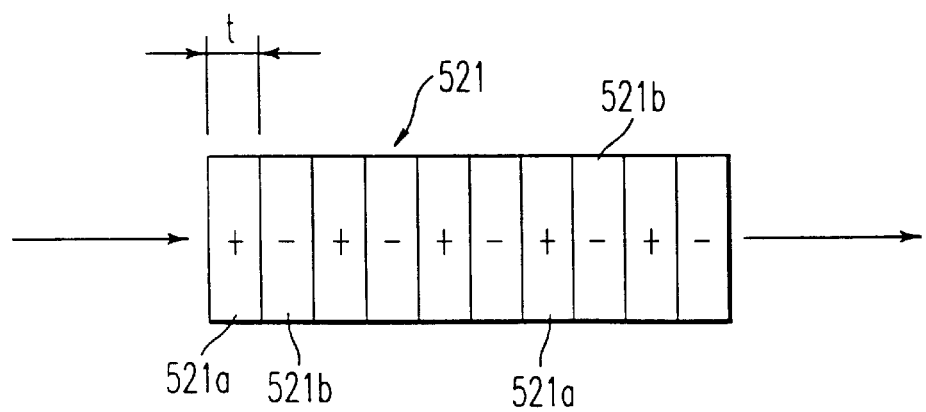
FIG. 16B is an outlined view of the single-crystal LBO used in the apparatus in FIG. 16A.

Sum frequency generation was carried out in the same manner as described EXAMPLE 13, except that a cubic BBO (β-BaB$_2$O$_4$) having a side of 5 mm was used for the laser apparatus shown in FIG. 16B.

Although an ultraviolet light beam of 5ω having an output power of 100 mJ was observed, the BBO has a restricted clearance of the phase matching angle and temperature and a high ultraviolet absorbance, resulting in heating during operation. Thus, high power 4ω and 5ω light beams cannot be generated stably for a long time. Further, the deterioration of the crystal was confirmed by the color center formation after 100 hours operation. The color center represents the point defect in the transparent single crystal which is detected by absorbance band generation.

Further, BBO normally contains impurities and the yield is low because of flux growing, resulting in increases in production costs. The single-crystal LBO of the present invention can solve such problems.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A method for converting the wavelength of light comprising:

irradiating a coherent light beam of a wavelength of less than 1,000 nm onto a light incident face of single-crystal lithium tetraborate ($Li_2B_4O_7$) at a predetermined angle, which is cut at a predetermined plane to an optical axis in order to satisfy a predetermined phase matching angle; thereby achieving the emission of a light beam having half the wavelength of the incident light beam.

2. The method of claim 1, wherein first and second coherent light beams having different wavelengths irradiate the light incident face of said single-crystal lithium tetraborate ($Li_2B_4O_7$) and a light beam having a wavelength which is the sum of the frequencies of mixing of the wavelengths of these two coherent light beams is emitted.

3. The method of claim 2 wherein, when the wavelength of said first coherent light beam is w and the wavelength of said second coherent light beam is $1/[(1/x)-(1/w)]$, a light beam having a wavelength of x is emitted from said single-crystal $Li_2B_4O_7$.

4. The method of claim 3, wherein the first coherent light beam and the second coherent light beam which has one-half or one-fourth the wavelength of the first coherent light beam irradiate the incident face of said single-crystal $Li_2B_4O_7$ at a predetermined angle, and at least a coherent light beam having one-third or one-fifth the wavelength of said first coherent light beam is emitted.

5. A method for converting a light wavelength comprising the step of:
   irradiating a light incident face of single-crystal lithium tetraborate ($Li_2B_4O_7$) at a predetermined angle, which is cut at a predetermined plane to an optical axis in order to satisfy a predetermined phase matching angle with first and second coherent light beams each having a different wavelength; a light beam having a wavelength which is the sum of the frequencies generated of the wavelengths of the two coherent light beams being emitted.

6. The method of claim 5, wherein when the wavelength of said first coherent light beam is w and the wavelength of said second coherent light beam is $1/[(1/x)-(1/w)]$, wherein a light beam having a wavelength of x is emitted from said single-crystal $Li_2B_4O_7$.

7. The method of claim 6, wherein the first coherent light beam and the second coherent light beam which has a one-half or one-fourth wavelength of the first coherent light beam irradiate the incident face of said single-crystal $Li_2B_4O_7$ at a predetermined angle, and at least a coherent light beam having a wavelength of one-third or one-fifth the wavelength of that of said first coherent light beam is emitted.

8. A method for converting a light wavelength, comprising:
   irradiating a light incident face of single crystal lithium tetraborate ($Li_2B_4O_7$) at a predetermined angle, which is cut at a predetermined plane to an optical axis in order to satisfy a predetermined phase matching angle and which has a refractive index variation of $10^{-5}$/mm or less and an etch-pit density of $1\times10^3$/$cm^2$ or less with a coherent light beam having a predetermined wavelength; thereby resulting in the emission of a coherent light beam having a wavelength half that of the incident light beam.

9. The method of claim 8, wherein first and second coherent light beams each having a different wavelength irradiate the light incident face of said single-crystal lithium tetraborate ($Li_2B_4O_7$) and a light beam having a wavelength which is the sum of the frequencies generated of the wavelengths of these two coherent light beams is emitted.

10. The method of claim 9, wherein said first coherent light beam having a wavelength of w and said second coherent light beam having a wavelength of $1/[(1/x)-(1/w)]$ irradiate said single crystal $Li_2B_4O_7$, and a light beam having a wavelength of x is emitted by sum frequency generation of these coherent light beams.

11. The method of claim 10, wherein said first coherent light beam and said second coherent light beam which has a wavelength of one-half or one-fourth of said first coherent light beam irradiate the incident face of said single-crystal ($Li_2B_4O_7$) at a predetermined angle, at least a light beam having a one-third or one-fifth wavelength the wavelength of said first light beam being emitted.

12. An optical wavelength converter comprising single-crystal lithium tetraborate ($Li_2B_4O_7$) which is cut at a predetermined plane to an optical axis and emits a light beam having a wavelength which is the sum of frequencies generated of first and second incident coherent light beams which irradiate a light incident face in order to satisfy a predetermined phase matching angle.

13. The optical wavelength converter of claim 12, wherein, when the wavelength of said first coherent light beam is w and the wavelength of said second coherent light beam is $1/[(1/x)-(1/w)]$, a light beam having a wavelength of x is emitted from said single-crystal $Li_2B_4O_7$.

14. The optical wavelength converter of claim 13, wherein said first coherent light beam having a predetermined wavelength and said second coherent light beam having a one-half or one-fourth wavelength of said first coherent light beam irradiate said single-crystal $Li_2B_4O_7$, and a light beam having a wavelength one-third or one-fifth of the wavelength of said first coherent light beam is emitted.

15. A laser apparatus comprising:
   the wavelength converter described in claim 12;
   a first light source which emits said first coherent light beam having a first wavelength;
   a second light source which emits said second coherent light beam having a second wavelength; and
   an optical device for introducing said first and second coherent light beams to a wavelength converter;
   wherein said laser apparatus emits a light beam having a wavelength which is the sum of frequencies generated by the wavelengths of said first and second coherent light beams.

16. The laser apparatus according to claim 15, wherein said second light source has the wavelength converter set forth in claim 12; and
   the first coherent light beam emitted from said first light source irradiates said wavelength converter and a light beam having a half wavelength of the incident light is emitted from said wavelength converter.

17. An optical-resonance-type laser apparatus comprising:
   a first wavelength converter as described in claim 12;
   a second wavelength converter as described in claim 12 provided at a position parallel to the first wavelength converter;
   a first half mirror, provided at the incident side of the first wavelength converter, by which the first coherent light beam irradiates the first wavelength converter;
   a second half mirror which receives a light beam emitted from the second wavelength converter to deflect it by a predetermined angle;
   a third mirror for deflecting the light beam emitted from the second half mirror to an incident face of the second wavelength converter; and a fourth mirror which deflects the light beam emitted from the second wavelength converter to the first half mirror in order to irradiate the first wavelength converter with the light beam;

wherein the first coherent light beam having a predetermined wavelength irradiates the first half mirror and a coherent light beam having a wavelength one-fifth of the first coherent light beam is emitted from the second half mirror.

18. An optical parametric oscillator comprising:

a light source for emitting a coherent light beam having a pumping frequency of $\omega_p$; and an optical parametric oscillating section having the wavelength converter described in claim 12 and first and second plano-concave half mirrors which receive the coherent light beam from the light source to achieve optical parametric oscillation in front of and behind the wavelength converter.

19. A laser apparatus for lithography comprising:

a light incident means which receives a first coherent light beam having a first wavelength and a second coherent light beam having a wavelength one-half or one-fourth of the wavelength of the first coherent light beam;

a wavelength converter described in claim 12;

a first plano-concave half mirror provided at the light incident side of said wavelength converter;

a second plano-concave half mirror provided at the light emitting side of said wavelength converter; and an optical filter provided behind said second half mirror.

20. The laser apparatus for lithography of claim 19, wherein the first coherent light beam which irradiates said light incident means is a laser beam from a light source selected from the group consisting of Nd:YAG laser, Nd:YVO$_4$ laser, Cr:LiSAF laser, ruby laser, glass laser, alexandrite laser, garnet laser, sapphire laser, and semiconductor laser.

21. The laser apparatus for lithography of claim 19, wherein the laser apparatus for lithography further comprises an integrator for smoothing the intensity of the light beam provided behind said optical filter.

22. A short wavelength solid-state laser apparatus for processing comprising:

a first light source which emits a first coherent light beam having a first wavelength;

a second light source which emits a second coherent light beam having a wavelength one-half or one-fourth of the first coherent light beam from the first light source; and the wavelength converter described in claim 12 which receives the first coherent light beam from said first light source and the second coherent light beam from said second light source;

wherein said first light source emits the first coherent light beam at a predetermined energy for processing for a predetermined time; and said wavelength converter emits a light beam having a wavelength one-fifth of the wavelength of said first coherent light beam.

23. Single-crystal lithium tetraborate (single crystal Li$_2$B$_4$O$_7$) cut at a predetermined plane to an optical axis, and having a refractive index variation of $10^{-5}$/mm or less and/or an etch-pit density of $1 \times 10^3$/cm$^2$ or less.

24. An optical wavelength converter comprising the single-crystal Li$_2$B$_4$O$_7$ set forth in claim 23, wherein a coherent light beam having a predetermined wavelength irradiates a light incident face of said single-crystal Li$_2$B$_4$O$_7$ at a predetermined incident angle in order to satisfy a predetermined phase matching angle which emits a light beam having a wavelength half of said incident light.

25. The optical wavelength converter according to claim 24, wherein when first and second coherent light beams which have different wavelengths irradiate a light incident face of said single-crystal Li$_2$B$_4$O$_7$, a light beam having a wavelength of sum frequency generation of the two coherent light beams being emitted from a light emitting face.

26. The optical wavelength converter according to claim 25, wherein the first coherent light beam having a wavelength of w and the second coherent light beam having a wavelength of $1/[(1/x)-(1/w)]$ irradiate said single-crystal Li$_2$B$_4$O$_7$, thereby obtaining an emitted light having a wavelength of x by sum frequency generation of two coherent light beams.

27. The optical wavelength converter according to claim 26, wherein the first coherent light beam having a wavelength of a first wavelength and the second coherent light beam having a wavelength one-half or one-fourth that of the first coherent light beam irradiates an incident face of said single crystal Li$_2$B$_4$O$_7$ at a predetermined angle in order to emit a light beam having a one-third and one-fifth wavelength of said first coherent light beam.

28. A laser apparatus comprising:

a wavelength converter as described in claim 25;

a first light source which emits a first coherent light beam having a first wavelength;

a second light source which emits a second coherent light beam having a second wavelength; and an optical device which introduces said first and second coherent light beams to said wavelength converter;

wherein a light beam having a wavelength which is the sum of frequencies generated of said first and second coherent light beams is emitted.

29. An optical-resonance-type laser apparatus comprising: a first wavelength converter as described in claim 25;

a second wavelength converter as described in claim 24, provided at a position parallel to the first wavelength converter;

a first half mirror provided at the incident side of the first wavelength converter in order to irradiate a first coherent light beam onto the first wavelength converter;

a second half mirror which receives the light emitted from the first wavelength converter and for deflecting the light by a predetermined angle;

a third mirror which deflects the light from the second half mirror toward an incident face of a second wavelength converter; and a fourth mirror which deflects the light emitted from the second wavelength converter toward the first half mirror in order to irradiate first wavelength converter;

wherein the first coherent light beam having a predetermined wavelength irradiates said first half mirror which then emits a coherent light beam having a wavelength one-fifth of the wavelength of the first coherent light beam from said second half mirror.

30. A laser apparatus for lithography comprising:

a light incident means which receives a first coherent light beam having a first wavelength and a second coherent light beam having a wavelength one-half or one-fourth of the wavelength of the first coherent light beam;

a wavelength converter as described in claim 25;

a first plano-concave half mirror provided at the light incident side of said wavelength converter;

a second plano-concave half mirror provided at the light emitting side of said wavelength converter; and an optical filter provided behind said second half mirror.

31. A short wavelength solid-state laser apparatus for processing comprising:

a first light source which emits a first coherent light beam having a first wavelength;

a second light source which emits a second coherent light beam having a wavelength one-half or one-fourth of the wavelength of the first coherent light beam from the first light source;

a wavelength converter as described in claim 25 which receives the first coherent light beam from said first light source and the second coherent light beam from said second light source;

wherein said first light source emits the first coherent light beam in a predetermined energy required for processing for a predetermined time; said said wavelength converter emitting a light beam having a wavelength one-fifth of the wavelength of said first coherent light beam.

32. A optical parametric oscillator comprising:

a light source for emitting a coherent light beam having a pumping frequency of $\omega_p$; and an optical parametric oscillating section having a wavelength converter as described in claim 24 and first and second plano-concave half mirrors, provided in front of and behind said wavelength converter, for receiving light from the coherent light source to achieve optical parametric oscillation.

33. A short wavelength solid-state laser apparatus for processing comprising:

a first optical wavelength converter using a nonlinear optical crystal for emitting a second coherent light beam having a wavelength one-half that of a first coherent light beam; and a second optical wavelength converter as described in claim 24 which emits a third coherent light beam having a wavelength half that of said second coherent light beam.

34. A laser apparatus comprising:

an optical wavelength converter comprising a single-crystal $Li_2B_4O_7$, which is cut at a predetermined plane to an optical axis in order to satisfy a predetermined phase matching angle, wherein two kinds of coherent light beams having different wavelengths irradiate a light incident face of said single crystal $Li_2B_4O_7$, thereby enabling the emission of a light beam having a wavelength which is the sum of frequencies generated of the wavelengths of the two incident light beams;

a first light source which emits the first coherent light beam having said first wavelength;

a second light source which emits the second coherent light beam having said second wavelength; and an optical device which introduces said first and second light beams to said wavelength converter;

wherein said laser apparatus emits a light beam having a wavelength which is the sum of frequencies generated of said first and second coherent light beams.

35. An optical-resonance-type laser apparatus comprising:

a first optical wavelength converter by which two kinds of coherent light beams having different wavelengths irradiate a light incident face of single-crystal lithium tetraborate ($Li_2B_4O_7$), which is cut at a predetermined plane to an optical axis in order to satisfy a predetermined phase matching angle, and by which a light beam having a wavelength which is the sum of frequencies generated of two coherent light beams is emitted;

a second optical wavelength converter provided at a position parallel to the first wavelength converter by which two kinds of coherent light beams having different wavelengths irradiate the light incident face of a single-crystal lithium tetraborate ($Li_2B_4O_7$), which is cut at a predetermined plane to the optical axis in order to satisfy a predetermined phase matching angle, and by which a light beam having a wavelength of sum frequency generation of two coherent light beams is emitted;

a first half mirror provided at the incident side of the first wavelength converter in order to irradiate first coherent light beam on the first wavelength converter;

a second half mirror which receives the light emitted from the first wavelength converter to deflect the light by a predetermined angle;

a third mirror which deflects the light emitted from the second wavelength converter toward the light incident face of the second wavelength converter; and a fourth mirror which deflects the light emitted from the second wavelength converter toward said first half mirror which deflects the light to the first wavelength converter;

wherein the first coherent light beam having a predetermined wavelength irradiates said first half mirror, and a light beam having a wavelength one-fifth of the wavelength of the first coherent light beam is emitted from said second half mirror.

36. An optical parametric oscillator comprising:

a light source for emitting a coherent light beam having a pumping frequency of $\omega_p$;

an optical wavelength converter, which receives the coherent light from said light source, irradiates two kinds of coherent light beams having different wavelengths to a light incident face of a single-crystal lithium tetraborate ($Li_2B_4O_7$), which is cut at a predetermined plane to an optical axis in order to receive the coherent light beam from the light source and satisfy a predetermined phase matching angle, and emits a light beam having a wavelength which is the sum of frequencies generated of two coherent light beams; and an optical parametric oscillating section comprising first and second plano-concave half mirrors provided in front of and behind said wavelength converter in order to perform optical parametric oscillation.

37. A laser apparatus for lithography comprising:

a light incident means which receives a first coherent light beam having a first wavelength and a second coherent light beam having a wavelength one-half or one-fourth of the wavelength of the first coherent light beam;

an optical wavelength converter for irradiating two kinds of coherent light beams having different wavelengths to a light incident face of single-crystal lithium tetraborate ($Li_2B_4O_7$) which is cut at a predetermined plane to an optical axis in order to satisfy a predetermined phase matching angle;

a first plano-concave half mirror provided at the light incident side of said wavelength converter;

a second plano-concave half mirror provided at the light emitting side of said wavelength converter; and an optical filter provided behind said second half mirror.

38. A short wavelength solid-state laser apparatus for processing comprising:
a first light source which emits a first coherent light beam having a first wavelength;
a second light source which emits a second coherent light beam having a wavelength one-half or one-fourth of the wavelength of the first coherent light beam from the first light source; and
an optical wavelength converter which receives two kinds of coherent light beams having different wavelengths from said first and second light sources to a light incident face of a single-crystal lithium tetraborate ($Li_2B_4O_7$), which is cut at a predetermined plane to an optical axis in order to satisfy a predetermined phase matching angle, and for emitting a light beam having a wavelength of the sum frequency generation of the two coherent light beams;
wherein said first light source emits the first coherent light beam at a predetermined energy for processing for a predetermined time; and
said wavelength converter emits a light beam having a wavelength one-third or one-fifth of the wavelength of said first coherent light beam.

39. A short wavelength solid-state laser apparatus for processing comprising:
a first optical wavelength converter which emits a second coherent light beam of a wavelength one-half of a first coherent light beam which irradiates a light incident face of a nonlinear optical crystal, which is cut at a predetermined plane to an optical axis, in order to satisfy a predetermined phase matching angle; and
a second optical wavelength converter which emits a third coherent light beam of a wavelength one-half of said second coherent light beam which irradiates a light incident face of single crystal lithium tetraborate ($Li_2B_4O_7$), which is cut at a predetermined plane to an optical axis, in order to satisfy a predetermined phase matching angle.

40. An optical converting and light emitting apparatus comprising single-crystal lithium tetraborate ($Li_2B_4O_7$) and an element for activating laser oscillation,
wherein said apparatus comprises a light source which provides light having a wavelength of less than 1000 nm as an incident beam to be converted in said single-crystal lithium tetraborate.

41. The optical converting and light emitting apparatus of claim 40, wherein said element for activating laser oscillation is a rare earth element, and the content ranges from 0.01 to 10 weight percent.

42. The optical converting and light emitting apparatus of claim 40, wherein said optical converting and light emitting apparatus irradiates a light incident face of a wavelength converter in order to satisfy a predetermined phase matching angle, with a laser light beam, thereby resulting in the emission of a predetermined laser light after wavelength conversion of the incident laser light beam.

43. A laser apparatus comprising:
a resonator comprising mirrors provided at both ends of the optical converting and light emitting apparatus as described in claim 40; and
a light source which emits a coherent light beam to said resonator;
wherein said resonator resonates said coherent light beam and emits a wavelength-converted light beam.

44. A laser light excitation-type laser apparatus comprising:
a resonator comprising mirrors provided at both ends of the optical converting and light emitting apparatus as described in claim 40 containing a rare earth element in a predetermined amount as an activator; and
a light source which emits to said resonator a light beam which is the sum of frequencies generated of an exciting light having a first wavelength of $\lambda_1$, a second light beam having a second wavelength of $\lambda_2$ generated by excitation and a third light beam having a third wavelength of $\lambda_3$ which is the second harmonic of the second light beam;
wherein said resonator emits a light beam having a wavelength which is the sum or difference of a plurality of light beams.

45. An optical converter device comprising a twinning crystal structure for performing quasi-phase matching, which is formed by piling up alternately right and left handed $Li_2B_4O_7$ crystals,
wherein said device comprises a light source which provides light having a wavelength of less than 1000 nm as an incident beam to be converted in said $Li_2B_4O_7$ crystals.

46. A laser apparatus comprising:
a first light source which emits a first coherent light beam;
a second light source which emits a second coherent light beam having a wavelength one-half or one-fourth of the wavelength of the first coherent light beam;
and an optical converter device as described in claim 45 which receives the first and second coherent light beams from said first and second light sources and which emits at least a coherent light beam having a wavelength one-third or one-fifth of the wavelength of said first coherent light beam.

47. A method for making a single-crystal lithium tetraborate by pulling molten lithium tetraborate $Li_2B_4O_7$ in a predetermined orientation by the Czochralski method, said method comprising:
pulling a single-crystal lithium tetraborate at a temperature gradient between a surface of a molten liquid and a position just 10 mm above the molten liquid ranging from 30° to 200° C./cm, a temperature gradient above said position ranging from 5° to 50° C./cm, and a pull-up speed ranging from 0.1 to 2 mm/hour;
wherein said single-crystal lithium tetraborate has a refractive index variation of $10^{-5}$/mm or less and/or an etch-pit density of approximately $1 \times 10^3$/cm$^2$ or less.

48. A method for making a single-crystal lithium tetraborate by pulling from molten lithium tetraborate $Li_2B_4O_7$, containing a predetermined amount of a laser oscillation activator in a predetermined orientation by the Czochralski method by pulling up the single-crystal of lithium tetraborate at a temperature gradient between the surface of the melted liquid and a position just 10 mm above the melted liquid ranging from 30° to 200° C./cm, a temperature gradient above the position ranging from 5° to 50° C./cm, and a pull-up speed ranging from 0.1 to 2 mm/hour.

49. An optical converting and light emitting apparatus comprising single-crystal lithium tetraborate ($Li_2B_4O_7$) which has a refractive index variation of $10^{-5}$/mm or less and/or an etch-pit density of $1 \times 10^3$/cm$^2$ or less, and an element for activating laser oscillation.

50. The optical converting and light emitting apparatus of claim 49, wherein said element for activating laser oscillation is a rare earth element, and the content ranges from 0.01 to 10 weight percent.

51. The optical converting and light emitting apparatus of claim 49, wherein said optical converting and light emitting apparatus irradiates a light incident face of a wavelength converter with a beam of laser light;

wherein said laser light and said incident face are set at a predetermined phase matching angle, said angle determined by a predetermined wavelength of light emitted by said apparatus.

52. A laser apparatus comprising:

a resonator comprising mirrors provided at both ends of said optical converting and light emitting apparatus as described in claim 49; and a light source which emits a coherent light beam to said resonator;

wherein said resonator resonates said coherent light beam and emits a wavelength-converted light beam.

53. A laser light excitation-type laser apparatus comprising:

a resonator comprising mirrors provided at both ends of said optical converting and light emitting apparatus as described in claim 49 containing a rare earth element in a predetermined amount as an activator; and a light source which emits to said resonator a light beam which is the sum of frequencies generated of an exciting light having a first wavelength of $\lambda_1$, a second light beam having a second wavelength of $\lambda_2$ generated by excitation and a third light beam having a third wavelength of $\lambda_3$ which is a second harmonic of the second light beam;

wherein said reasonator emits a light beam having a wavelength which is the sum or difference of a plurality of light beams.

54. An optical converter device comprising a twinning crystal structure for performing quasi-phase matching, which is formed by piling up alternately right and left handed $Li_2B_4O_7$ crystals, wherein said crystals have a refractive index variation of $10^{-5}$/mm or less and/or an etch-pit density of $1 \times 10^3$/cm$^2$ or less.

55. A laser apparatus comprising:

a first light source which emits a first coherent light beam;

a second light source which emits a second coherent light beam having a wavelength that is one-half or one-fourth of the wavelength of the first coherent light beam;

and an optical converter device as described in claim 54 which receives said first and said second coherent light beams from said first and said second light sources and which emits at least one coherent light beam having a wavelength one-third or one-fifth of the wavelength of said first coherent light beam.

* * * * *

UNITED STATES PATENT AND TRADEMARK OFFICE
CERTIFICATE OF CORRECTION

PATENT NO. : 5,805,626
DATED : SEPTEMBER 8, 1998
INVENTOR(S) : KOMATSU ET AL

It is certified that error appears in the above-identified patent and that said Letters Patent is hereby corrected as shown below:

Column 1, line 52, "abrasion" should read --ablation--.

Column 4, line 55, "innverter" should read --inverter--.

Column 8, line 21, "perform optical a parametric" should read --perform an optical parametric--.

Column 11, line 39, "($Li_2B_4O_7$)" should read --$Li_2B_4O_7$--.

Column 12, line 4, " transition" should read --dislocation--.

Column 12, line 29, " transition" should read --dislocation--.

Column 15, line 23, "the phase-machined" should read --the phase-matched--.

Column 15, line 62, "LOB" should read --LBO--.

Column 25, line 62, "LOB" should read --LBO--.

Column 26, line 32, " transition" should read --dislocation--.

Column 27, line 23, "absorbance band" should read --absorption band--.

Column 27, line 54 "LOB" should read --LBO--.

UNITED STATES PATENT AND TRADEMARK OFFICE
CERTIFICATE OF CORRECTION

PATENT NO. : 5,805,626
DATED : SEPTEMBER 8, 1998
INVENTOR(S) : KOMATSU ET AL

It is certified that error appears in the above-identified patent and that said Letters Patent is hereby corrected as shown below:

Column 27, line 62, "Abrasion" should read --Ablation--.

Column 28, line 34, "abrasion" should read --ablation--.

Column 28, line 52, "abrasion" should read --ablation--.

Column 29, line 37, "the kind id and/or" should read --the kind and/or--.

Column 30, line 14, "Single-CrYstal-Production" should read --Single-Crystal-Production--.

Column 30, line 20, "just 0.1 cm" should read --just 1.0 cm--;

line 21, "200° C./mm" should read --200°C./cm--;

line 22 "50° C./mm" should read --50°C./cm--;

line 23, "1 to 2" should read --0.1 to 2";

line 41, "80° C./mm" should read --80° C./cm--; and line 42, "30° C./mm" should read --30° C./cm--.

UNITED STATES PATENT AND TRADEMARK OFFICE
CERTIFICATE OF CORRECTION

PATENT NO. : 5,805,626
DATED : SEPTEMBER 8, 1998
INVENTOR(S) : KOMATSU ET AL

It is certified that error appears in the above-identified patent and that said Letters Patent is hereby corrected as shown below:

Column 33, line 40 "80° C./mm" should read --80° C./cm--; and line 41, "30° C./mm" should read --30° C./cm--.

Column 34, line 53, "by absorbance" should read --absorption--.

Signed and Sealed this

Fourteenth Day of December, 1999

Attest:

Q. TODD DICKINSON

Attesting Officer

Acting Commissioner of Patents and Trademarks